US008662977B1

(12) United States Patent
Nicolas et al.

(10) Patent No.: US 8,662,977 B1
(45) Date of Patent: *Mar. 4, 2014

(54) MULTIPLE PLAYS FOR FREE GAMES

(76) Inventors: Jean-Francois Pascal Nicolas, Marly-le-Roi (FR); Jean Luc Cadranel, Montpellier (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/374,699

(22) Filed: Jan. 9, 2012

Related U.S. Application Data

(63) Continuation-in-part of application No. 12/003,394, filed on Dec. 26, 2007, now Pat. No. 8,118,654.

(60) Provisional application No. 60/877,101, filed on Dec. 26, 2006.

(51) Int. Cl.
*A63F 9/24* (2006.01)
*G06Q 40/00* (2012.01)

(52) U.S. Cl.
USPC ............... 463/9; 463/1; 705/35; 705/36 R; 705/37

(58) Field of Classification Search
USPC .................... 463/1, 9; 705/36 R, 37
See application file for complete search history.

(56) References Cited

U.S. PATENT DOCUMENTS

| | | | | |
|---|---|---|---|---|
| 4,363,489 A * | 12/1982 | Chodak et al. | 273/237 |
| 5,713,793 A * | 2/1998 | Holte | 463/25 |
| 5,842,921 A * | 12/1998 | Mindes et al. | 463/16 |
| 6,024,641 A * | 2/2000 | Sarno | 463/17 |
| 6,061,662 A * | 5/2000 | Makivic | 705/36 R |
| 6,126,543 A * | 10/2000 | Friedman | 463/16 |
| 6,236,900 B1 * | 5/2001 | Geiger | 700/91 |
| 6,321,212 B1 * | 11/2001 | Lange | 705/36 R |
| 6,381,586 B1 * | 4/2002 | Glasserman et al. | 705/36 R |
| 6,473,084 B1 * | 10/2002 | Phillips et al. | 345/440 |
| 6,606,615 B1 * | 8/2003 | Jennings et al. | 706/45 |
| 6,681,211 B1 * | 1/2004 | Gatto | 705/36 R |
| 6,688,978 B1 * | 2/2004 | Herman | 463/25 |
| 6,709,330 B1 * | 3/2004 | Klein et al. | 463/9 |
| 6,910,965 B2 * | 6/2005 | Downes | 463/28 |
| 7,024,384 B2 * | 4/2006 | Daughtery, III | 705/36 R |
| 7,040,982 B1 * | 5/2006 | Jarvis et al. | 463/9 |
| 7,072,863 B1 * | 7/2006 | Phillips et al. | 705/36 R |
| 7,206,762 B2 * | 4/2007 | Sireau | 705/37 |
| 7,212,998 B1 * | 5/2007 | Muller | 705/36 R |
| 7,233,922 B2 * | 6/2007 | Asher et al. | 705/36 R |
| 7,236,953 B1 * | 6/2007 | Cooper et al. | 705/36 R |
| 7,338,360 B2 * | 3/2008 | Jarvis et al. | 463/9 |
| 7,359,876 B1 * | 4/2008 | Redpath et al. | 705/37 |
| 7,386,500 B1 * | 6/2008 | Payne | 705/37 |
| 7,451,213 B2 * | 11/2008 | Kaplan | 709/224 |
| 7,542,937 B1 * | 6/2009 | Cohen | 705/37 |
| 7,563,162 B2 * | 7/2009 | Lawson et al. | 463/16 |
| 7,711,628 B2 * | 5/2010 | Davie et al. | 705/37 |
| 7,769,661 B1 * | 8/2010 | Joss | 705/36 R |
| 7,783,552 B2 * | 8/2010 | Assia et al. | 705/36 R |
| 7,797,215 B1 * | 9/2010 | Zerenner et al. | 705/36 R |
| 7,946,922 B2 * | 5/2011 | Yin | 463/42 |
| 7,962,400 B2 * | 6/2011 | Amaitis et al. | 705/37 |
| 2001/0056391 A1 * | 12/2001 | Schultz | 705/36 |
| 2002/0073007 A1 * | 6/2002 | Ayache | 705/36 |
| 2002/0099640 A1 * | 7/2002 | Lange | 705/37 |
| 2002/0120542 A1 * | 8/2002 | Higgins | 705/36 |
| 2003/0004748 A1 * | 1/2003 | Coleman et al. | 705/1 |
| 2003/0144947 A1 * | 7/2003 | Payne | 705/37 |
| 2004/0024677 A1 * | 2/2004 | Wallman | 705/36 |
| 2004/0199442 A1 * | 10/2004 | Haberle | 705/35 |
| 2005/0197948 A1 * | 9/2005 | Davie et al. | 705/37 |
| 2005/0208996 A1 * | 9/2005 | Friedman | 463/25 |
| 2006/0082061 A1 * | 4/2006 | Kertcher | 273/256 |
| 2006/0199631 A1 * | 9/2006 | McGill et al. | 463/16 |
| 2007/0087819 A1 * | 4/2007 | Van Luchene et al. | 463/25 |
| 2007/0099685 A1 * | 5/2007 | Van Luchene | 463/1 |
| 2008/0027880 A1 * | 1/2008 | Yu | 705/36 R |

* cited by examiner

*Primary Examiner* — William Brewster
*Assistant Examiner* — Jason Skaarup

(57) ABSTRACT

The invention comprises a method for multiple plays for free games. Some games of chance, or of skill, or of mixed skill and chance are only or can only be proposed for free to players. Enabling players to play many more times for free associated with a paid-for service of generation of multiple free plays is the main purpose of the invention. It comprises, namely, an embodiment for a free lottery and an embodiment for a financial forecasting game. It comprises an additional description, for a financial game, of automatic or semi-automatic generation of forecasts.

20 Claims, No Drawings

MULTIPLE PLAYS FOR FREE GAMES

CROSS-REFERENCE TO RELATED APPLICATIONS

This application is a continuation in part of U.S. Ser. No. 12/003,394, filed on Dec. 26, 2007 now U.S. Pat. No. 8,111,654 which is related to and claims the benefit of U.S. Provisional Application 60/877,101, filed Dec. 26, 2006, and all of which are incorporated in their entirety herein by reference.

STATEMENT REGARDING FEDERALLY SPONSORED RESEARCH OR DEVELOPMENT

Not applicable.

REFERENCE TO SEQUENCE LISTING, A TABLE, OR A COMPUTER LISTING COMPACT DISK APPENDIX

Not applicable.

BACKGROUND OF THE INVENTION

1. Field of the Invention

The present invention relates generally to four several fields: games, education, finance and modeling. More particularly, the present invention relates to a financial forecasting game and the financial methods and mathematical models elaborated therefore and the applications of those to the finance field. Concerning the games field, the present invention relates to games including means for processing electronic data in a game requiring strategy or problem solving by a participant. Concerning the education field, the present invention relates to the education and demonstration field for business or economics. Concerning the finance field, the present invention relates to trading, matching or bidding. Concerning the modeling field, the present invention relates to modeling by mathematical expression.

2. Related Art

Stock Market Games

Over the last years, the development of new information and communication technologies, and namely the Internet, has totally transformed the relationship between financial operators and customers. As financial information and services are now available online, stock market games are commonly used by financial operators to promote their commercial offers of trading services and investment products through remote communication systems.

These games are usually simulation games, namely portfolio management games. Players are taken into reality-based environments where they can make virtual investment decisions and measure their would-be performance. The main purpose of these games is educational, as lack of knowledge concerning market mechanisms and financial techniques is most always alleged when people explain why they are reluctant to become investors. By enabling users to discover and practise trading techniques without risking real money, financial operators expects some of them will eventually invest their money and become their customers.

The fact is that predicting market trends and building corresponding investment strategies is of a matter of knowledge and experience and not a matter of chance. Analysts comments, market reports, technical analysis or charts, namely, may be used for decision making.

In order to make them attractive, and not only educational, financial operators usually organise financial market games as competitions where top-ranked players win prizes. Players are given a virtual amount of capital to trade with. At the end of the competition duration—for instance after two weeks—, amounts of virtual capital are compared and the best performers—for instance the three first ones—win pre-announced prizes.

Organising a competition is an easy way for the game organiser to limit its own risks relative to prizes distribution. Amounts dedicated to prizes are fixed in advance, allocated to a pre-defined number of winners and/or divided among winners if needed. As prizes do not depend on market variations, the risk of the game organiser is fixed and limited.

But such financial games have limitations and drawbacks, and namely the following ones:

they require a real commitment. Players have to play every day and over a relatively long period, for instance two weeks before they know if they win. This namely is a major drawback in the Internet world where users expect everything to be fast.

they are more educational than fun. Therefore, they are definitely suitable for someone who is already motivated: for instance, someone who is almost decided to become an investor but still hesitates or someone who is decided to take a financial training. But they are not suitable to attract the attention of someone who had no previous motivation and their concept may even be deterrent for absolute beginners.

they are organised like competitions. Therefore, players win prizes not by direct reference to the market but by reference to other players. Namely, a player can perform well but never be rewarded because of better-ranked competitors. A bad performer can even be rewarded with a bad market performance as soon as others are worse players than him. This is due to the fact that gains are never triggered by market conditions exclusively, which is of course the case in the real market. This is a real paradox as those games claim to be close to the market reality for playing but have nothing in common with market rules anymore when it comes to gains.

moreover, the number of winners is defined in advance in the competition rule. Mathematically, the more players there are in the competition, the less chances there are for a individual player to win a prize. For an individual player, a competition almost stops to be attractive in terms of gains as soon as it becomes successful in terms of audience.

in addition, individual gains a winner can get from the game are not variable according to market evolutions. In real markets, value variations and volatility directly drive players strategies.

By contrast, financial trading is not a matter of competition but a matter of individual anticipation. What is needed is a game which can enable players, not only to play but also to gain according to real market rules: individual gains which do not depend on the number of other players or winners but only on real markets evolutions. In other words, what is needed is a free game offer built as a real financial product offer wherein financial products would be distributed for free on a regular basis and give the right to a prize in the case of good market anticipation.

This is close to the definition of a financial option, but presently existing options have a far too limited leverage to be used as such financial products. Their cost is too high to be taken on by a game organiser in order to distribute them for free to the players. What is needed is a very high leverage new type of option which can both have a limited cost and, under specified conditions, give the right to high value prizes in the very short term.

What is further needed is a method of risk measurement and mathematical modeling which can enable the game organiser to estimate and pilot its costs relative to prizes.

What is also needed is a commercial method which can make the general public aware of the specificity of such a game offer: not another presently existing stock market competition but a game where you can make individual gains from the market for free.

Finance and Trading

Financial markets enable investors to invest in assets which can be more or less risky assets according to the risk exposure they choose and the anticipation on the future variation of the assets they make.

An investor who is ready to take more risks for higher expected pay offs can conduct different strategies in order to leverage its investment:

he can buy a listed asset with a high volatility. He will have to bring the total amount of money to be able to buy it, but the potential leverage comes from the fact that, because of the volatility, there are more chances he gets a higher variation in quotations, i.e. a higher gain or a higher loss, he can buy a futures or forward contract. The high potential leverage comes from the fact he will have to bring immediately only a fraction of the total value of the underlying asset to buy it (for instance 20%) whereas he can expect a future gain or loss relative to the total value of the underlying asset, he can buy an option contract or warrant. The higher potential leverage comes from the fact he doesn't purchase the underlying asset, but only the right to buy it or sell it according to predefined contract terms. The purchase price is therefore far lower, as the right can only be exercised under specified conditions, namely conditions concerning the value of the underlying asset until the expiration date of the contract.

Let us give an illustrative example of a good anticipation decision. In the first case hereabove, investing 100 dollars in an underlying which goes upward to 150 dollars would make a return of 150 minus 100 divided by 100 i.e. a leverage coefficient of 0.5. In the second case, investing 20% of 100 dollars for a similar underlying asset which goes upward to 150 dollars would make a return of 150 minus 100 divided by 20, i.e. a leverage coefficient of 2.5. In the third case, good deals on the options markets can often show returns with leverage coefficients comprised between 2 and 20.

Let us keep the same example but with a wrong anticipation decision. In the first case, investing 100 dollars in an underlying which goes downward to 50 dollars would make a return of 50 minus 100 divided by 100 i.e. a leverage coefficient of minus 0.5. In the second case, investing 20% of 100 dollars for a similar underlying asset which goes downward to 50 dollars would make a return of 50 minus 100 divided by 20, i.e. a leverage coefficient of minus 2.5. In the third case, bad deals on the options markets at worst make you lose your money, i.e. a leverage coefficient of minus 1.

These existing solutions have limitations and drawbacks for the regular investor, and namely the following ones:

playing the volatility of assets gives a very limited leverage only, playing futures or forward contracts expose the investor to a loss potentially greater than the capital needed to initiate the financial operation, the options and warrants offers remain complex to deal with for the regular investor, there is no offer of very high leveraged products to the regular investor, i.e. with a leverage coefficient (in the sense of the calculations hereabove) of 200, 1000 and more.

Proposing very high leveraged products on the financial markets would have many advantages:

very high leveraged products can be traded at a very low price unit, and therefore make it possible for people to become an investor with less money and give open access to the financial markets to a broader range of people, very high leveraged products can show very high returns if the anticipation is good, and therefore make it possible for financial operators to attract new customers with this type of product, for instance gamblers who are presently only considering making money with games of luck and without strategy, attracting the huge amount of money spent in games of luck towards the financial markets would add risk-taking capacities to the market and, eventually, enable more listed companies to invest in many more risky projects, and namely in the innovation field, What is needed is a financial method to provide the regular investor with a financial product which have a far higher leverage than presently existing ones, that product being built as an option or warrant in order to limit the potential negative leverage.

Finance and Trading:Risk Coverage

Options are specific derivative securities which were originally created to enable investors who are concerned with an primary asset (such as stocks, bonds, raw material) to cover their risks of financial loss. However, in theory as well as in practise, covering risks related to an asset considerably reduces total potential gains because of high costs of risk coverage. In the best case, gains are then those you can expect from a non-risky asset such as a monetary asset. Therefore, a new type of derivative product which could notably reduce risk coverage costs would be very useful.

Moreover, financial markets are now global. Many american companies are now financed by foreign investment funds which invest in stocks. Foreign investment funds also purchase US Treasury Notes and massively finance the american public debt. But these foreign investors are then facing a double risk: first, the risk to see a decline in the value of the particular asset they purchase and, secondly, the risk to see a decline in the value of the dollar expressed in their own foreign currency. For those specific investors, a new type of derivative product which could reduce risk coverage costs would be a major issue.

BRIEF SUMMARY OF THE INVENTION

The invention is relative to a financial forecasting game making use of combined financial assets. It comprises the general description of the game method, methods and processes set up to operate the game, a specific embodiment functioning with three stock market indexes, and other particular embodiments of the game.

The general description of the process explains the principles of a financial forecasting game. The players have to forecast the level of quotations in the future, on a given date, of several quoted securities. The players express their forecasts in a combined bet form, i.e. their forecasts for those different securities are considered as one single bet. On maturity date, and for each concerned security, the effective quotation level is compared with the forecast. This enables the game organiser to identify the forecasts which turned out to be correct. A single bet, being composed of several expressed forecasts, can therefore contain a variable number of correct forecasts.

The number of correct forecasts appearing within a single bet is used as criteria to determine the list of winning bets. A diversity of winning combinations is possible, the best being a combined bet where every forecast turned out to be correct. Those winning combinations can also be considered on a group of bets, and namely a group composed of a similar bet placed on several consecutive periods.

The gains attributed to the winning bets can be fixed amounts. They can also be variable amounts, calculated in that case using one or several predefined mathematical formulas including elements which vary along with the financial markets.

In addition to its innovative content, the usefulness of the invention and its working processes concern several fields:
- it enables the game organiser to produce a financial market game which can be probability modeled,
- it enables the game organiser to pay the winners with individual amounts (and not only one amount shared between the winners or attributed to the first winner only),
- it enables the game organiser to pay the winners with variable amounts which depend on the evolution of the stock markets (and not only fixed amounts).

The basic characteristics of the game invented, the fact that gains are individual, unlimited in number, unshared by winners, closely related to the evolution of the financial markets, normally paid in cash, enable the organiser using Internet to offer to players services very similar to those proposed by a financial futures or options trading platform dealing with stock-markets. That represents an original way to educate people to financial culture using the new business process of a free place where you can make stock gains without capital.

Particularly, in one of the services offered called game b, the gains of a player even vary in function of the moves of the stock-markets and their volatility. As a matter of fact, this method can be used as well for a game service or for delivering a specific financial security very close to a financial option. This specific financial security called here dot-option can offer to investors a level effect in a range of 200 to 1000 whereas existing options have a level effect comprised between 2 and 20. These high leverage products can be traded at a very low price unit and therefore can give open access to the financial markets to a broader range of people deserting games of luck for the financing of industry and innovation.

Another method developed in the game to multiply the level effect is the combined betting on different assets. The use of this process in the financial field can give birth to multi-assets options. This kind of derivative product could notably secure the investors in financial markets by reducing risk coverage costs. They are particularly adapted to foreign investors on stocks or Notes suffering of both a risk of investment and a risk of change.

BRIEF DESCRIPTION OF THE SEVERAL VIEWS OF THE DRAWING

Not applicable

DETAILED DESCRIPTION OF THE INVENTION

The invention comprises:
1—A method for a stock market game using combined financial assets,
2—Methods and processes enabling the implementation of such a game, namely:
 2.A—Methods and processes enabling the game organiser to increase or to decrease the number of winning bets,
 2.B—Methods and processes enabling the game organiser to calculate the occurrence probability of winning situations,
 2.C—Methods and processes enabling the game organiser to calculate the mathematical expectation of payments to the winners,
 2.D—Methods and processes enabling the game organiser to pay the winners with variable amounts depending on the evolution of the stock markets,
 2.E—Methods and processes enabling the game organiser to pattern the size of variable amounts paid to the winners according to a predefined average amount level,
 2.F—Methods and processes enabling the game organiser to measure game performances for each player,
3—A detailed particular embodiment of the game with its methods and processes
 3.A—Description of the embodiment and its specific game rules and principles
 3.B—Methods and processes enabling the game organiser to determine the probability law
 3.C—Methods and processes enabling the game organiser to validate and optimise the model
 3.D—Methods and processes enabling the game organiser to calculate the combinations
 3.E—Methods and processes enabling the game organiser to calculate the risks
 3.F—Methods and processes enabling the game organiser to calculate the steering variables
4—Other particular embodiments of the game, using similar methods and processes as in parts 2 and 3 hereabove.
5—Methods and processes enabling a financial operator to use the preceeding methods and processes exposed in order to distribute financial products.
6—Methods and processes enabling a financial operator to provide a multi-assets option.
1—A Method for a Financial Forecasting Game Making Use of Combined Financial Assets
Further description of the game method (developing the brief description of the invention hereabove):
Game General Principle The game general principle consists in considering several quoted securities during a given period, to gather the players forecasts on the level of quotation at the end of the period, to determine the list of the winning combined bets and the corresponding gains by using calculation methods.
Compliance with Applicable Laws The game implementations have to comply with applicable laws and regulations in the States where the game is run. Namely, they will have to comply with laws and regulations ruling minors protection, online gambling, free online gaming, chargeable online gaming, and all legal constraints set up by the financial markets relevant authorities (namely the SEC—Securities and Exchange Commission—and the CFTC—Commodity Futures Trading Commission—).
Technical Environment of the Game The exchange of information between the game organiser and the players is carried through means of remote communications (Internet, mobile phone, fixed telephone, interactive television, interactive kiosks, etc). The game organiser uses material equipments and softwares enabling him to deliver its services to the players through a communication network. The players can access the game through their terminals by remote connection to a communication network.
Players Identification On their first connection, players have to fill in a registration form which namely enables the game organiser to establish their precise identification and their legal right to participate in the game (namely for conditions concerning age and State residence). Then, on each game participation, players must give out their identity so that their forecasts can trustfully be attributed to them. A password system can be used therefore, or any other system enabling the game organiser to obtain that result.

Game Organisation

The game organiser chooses the periods of time and the financial securities on which he authorizes the players to make forecasts. The forecasts are expressed in a numerical format predefined by the game organiser. The game organiser announces the rules of the game. Namely, he announces the conditions and the precision degree under which forecasts will be considered to be correct at the end of the game period, combinations which will be considered as winning at the end of the game period, the nature of the corresponding gains, the rules of calculating the corresponding gains, the rules of attributing the gains to the winners.

Game Action

For the player, the game action consists in giving out its forecasts in the format and under the conditions required by the game organiser. The forecasts concern, for a given period of time, several quoted financial securities. Once he has given out its forecasts, the player has to validate his choices by actuating a button specified by the game organiser.

Notice of Winning Bets

At the end of the given period of time, the gathered forecasts on the quoted securities are compared to the effective quotation levels of those securities. The game organiser can then notice the reality of winning situations according to the previously announced rules, namely those defining the precision degree required for the forecasts and those defining the winning combinations. On that basis, the game organiser can proceed the gains calculations and then attribute the gains according to the previously announced game rules.

Application Fields

The considered period of time can be any type of duration and namely a day, a week, a fortnight, a month, an hour, a minute.

The considered quoted financial securities can be any type of security or fund, quoted either on a spot or forward market, and namely quotes for market indexes, stocks, currency exchange rates, precious substance, gold, raw material, oil, energy securities, bonds, trackers, mutual funds.

The considered winning combinations can be any type of combination made of expressed forecasts on securities and considered as correct. Namely, it is possible to consider a bet in which every single expressed forecast is correct, it is possible to consider a bet in which some of the expressed forecasts are correct, it is possible to consider several bets—and not a single one—as a group and apply combination analysis to the so-built set.

In that case, a set of bets can be any type of set. For instance, and those are not limitative examples, it can namely be a set of bets which are consecutive through time, a set of bets of similar type, a set of bets of different types, a set of bets expressed by different players.

2.A—Methods and Processes Enabling the Game Organiser to Increase or to Decrease the Number of Winning Bets 2.A.1—Concerning Correct Forecasts A general method consists in introducing variations in the precision level required so that the game organiser takes the expressed forecast as a correct forecast. To tolerate a lower precision level leads to consider a higher number of expressed forecasts as correct. On the contrary, to require a higher precision level leads to consider a lower number of expressed forecasts as correct.

A process to get a maximum precision level is to require an exact equality between the forecast expressed by the player and the effective value of the quote at the end of the considered period of time. When the securities are quoted with values including a whole number portion and a decimal portion, the exact total value has to be taken into account to consider an expressed forecast as a correct forecast.

A process to introduce tolerance margins in the game is to consider only the whole number portion of the quote. For example, a forecast for a quote where $<<n>>$ is the whole number portion and $<<d>>$ the decimal portion can then be considered as a correct forecast whatever the value of $<<d>>$ as long as $<<n>>$ is exact.

Another process to introduce tolerance margins in the game is to consider a deviation is acceptable, that deviation being expressed in points. For example, a forecast for a quote where $<<n>>$ is the whole number portion and $<<d>>$ the decimal portion can then be considered as a correct forecast whatever the value of $<<d>>$ as long as $<<n>>$ is exact, or $<<n-1>>$ is exact, or $<<n+1>>$ is exact. We then say the tolerance margin is fixed by the game organiser to one point above or under the whole number portion of the quote.

The process explained hereabove can be applied with tolerance margins which the game organiser can fix to 1, 2, 3 . . . n points above or under the whole number portion of the quote.

Another process to introduce tolerance margins in the game is to apply the process explained hereabove, but the tolerance being expressed in fractions of points. This process can be applied to quotes with a lower nominal value (such as certain stocks) or to quotes including a long decimal portion (such as currency exchange rates).

2.A.2—Concerning Winning Combinations

A general method consists in using variations of the combinations number $C(n,p)$ where $<<n>>$ is the total number of forecasts included in a combined bet and where $<<p>>$ is the minimum number of correct forecasts required for the bet to be considered as a winning bet by the game organiser.

One process consists in using variations of the number $<<n>>$ of forecasts composing a same bet.

Another process consists in using variations of the minimum number $<<p>>$ of correct forecasts required for the bet to be considered as a winning bet.

Another process consists in using the two processes described above together.

Another process consists in setting groups of bets, which can lead to variations of $<<n>>$ and $<<p>>$, and apply combinatory analysis to the so-built sets.

2.B—Methods and Processes Enabling the Game Organiser to Calculate the Occurrence Probability of Winning Situations The general method consists in determining successively the probability law of a quoted security, the probability that winners exist on that security, to proceed that way for each security included in the bet, to apply a combinatory calculation to the probabilities of existence of winning forecasts in order to determine the probability of existence of a winning bet.

The methods and processes used are as follows:

2.B.1—Determination of the Probability Law of the Quoted Security

For a given security, a process consists in considering that the variation in the quotes between two consecutive periods of time, expressed as a percentage, forms through time a series whose distribution can be approximated by a Gauss law. The study of historical quotes enables the game organiser to determine a value for the average <<m>> and the standard deviation <<σ>>. This process enables the game organiser to determine for the quoted security a distribution law of its possible values, and consequently, to quantify an occurrence probability for each of those values.

A process which is a variant of the previous process consists in considering sliding horizons. The study of historical quotes is realised on the same series as above. But the calculations are made with sliding averages and sliding standard deviations calculated on the last <<n>> periods of time. The number <<n>>, which determines the sliding horizon, can be optimised using a statistical study of historical quotes in order to obtain the best approximation of the quoted security distribution.

2.B.2—Determination of the Existence Probability of Winning Forecasts

The general method consists in taking into account both the distribution law of the players forecasts and the distribution law of the quoted security.

A process consists in considering that the distribution law of the players forecast is equivalent to the distribution law of the quoted security. The probability of existence of winning forecasts can then be estimated using the of the distribution law squared.

2.B.3—Probability of Existence of a Winning Bet

The general method consists in applying combinatory calculations to the events <<existence of winning forecasts>>, the elementary probability of each event being calculated with the processes hereabove defined.

2.B.4—Probability of Existence of a Winning Bets Group

The general method consists in applying combinatory calculations appropriate to the particular situations of one or several groups of winning bets.

2.C—Methods and Processes Enabling the Game Organiser to Calculate the Mathematical Expectation of Payments to the Winners The methods and processes used are as follows:

2.C.1—Process to Determine the Mathematical Expectation of a Fixed Payment $E(F)=p \times F$ where E is the mathematical expectation of a fixed payment, F the fixed amount, and p the probability of existence of a winning bet 2.C.2—Process to Determine the Mathematical Expectation of a Payment which Varies According to the Difference in Security Quotes Through Time (for One Forecast).

A process consists in using the probability law of existence of winning forecasts (called G) as defined in paragraph 2B2 of the previous part and consider that the variable amount paid to each winner is the variation in quotes through time, calculated as the difference between two quotes, expressed in points and in absolute value (called |t|).

$$\text{Using that process, } E(|t|) = \int_{-\infty}^{+\infty} |t| G(t) \, dt$$

The mathematical expectation can then be calculated using mathematical methods (changes of variables, vectorial sums, equation fractioning) or by computer with mathematical software.

2.C.3—Process to Determine the Combined Mathematical Expectation of a Payment which Varies According to the Difference in Security Quotes Through Time (for One Bet Composed of several forecasts).

A process consists in considering that the forecasts composing a same bet correspond to independent random variables A, B . . . Z.

It is therefore possible to develop the formula $E(|A|+ \ldots +|Z|)$ expressing it as a function of elementary mathematical expectations $E(|A|), E(|B|), \ldots, E(|Z|)$, of elementary probabilities $p(A), p(B), \ldots, p(Z)$, and taking into account the combinations considered as winning combinations (number of winning forecasts required to qualify a winning bet).

The terms $E(|A|), \ldots, E(|Z|)$ are the mathematical expectations for the securities A, . . . Z and are calculated using the process defined hereabove in paragraph 2C2. The terms $p(A), p(B), \ldots p(Z)$ are the forecast probabilities for the securities A, . . . Z and are calculated using the method and processes defined hereabove in paragraph 2B2 of the previous part.

A particular application of that process to a combined bet composed of three forecasts where the three forecasts have to be winning forecasts to qualify a winning bet gives the following formula:

$$E(|A|+|B|+|C|)=E(|A|) \times p(B) \times p(C)+E(|B|) \times p(A) \times p(C)+E(|C|) \times p(A) \times p(B)$$

2.D—Methods and Processes Enabling the Game Organiser to Pay the Winners with Variable Amounts Depending on the Evolution of the Stock Markets The general method consists in announcing, instead of a fixed gain whose amount is determined in advance, a variable gain whose amount is not determined in advance but calculated by using a formula determined in advance. This formula is a mathematical function which, for every forecast, depends on variable data taken from the financial markets and on fixed parameters fixed in advance by the game organiser.

A process consists in announcing a formula which considers the following elements (for every forecast):

1—the variable taken from the financial markets is the difference in quotation levels noted through time. For a quote value at the end of the previous period being (Ct), and a quote value at the end of the current period of time being (Ct+1), the considered variable called Delta is the absolute value |(Ct+1)−(Ct)|.

2—the parameter Vp is determined in advance by the game organiser and is called <<point value>>.

3—the formula enabling the game organiser to pay the winning forecast is Gain=Delta×Vp.

For each winning bet, the calculation method consists then in considering every correct forecast within the winning bet, then applying the process hereabove to determine the gain corresponding to each of those correct forecasts within the winning bet, and eventually make a sum of all those gains.

A process to simplify the previous process consists in considering only one point value Vp, which is determined for all the forecasts, whatever the security. The gain corresponding to the winning bet is then calculated by taking the sum of the quotes variations (sum of the Deltas) multiplied by a unique parameter Vp.

For the calculation of quote variations, an exact way of proceeding is to consider the total value of the quote including the whole number portion and the decimal portion. It is also possible to proceed with rounded numbers, by calculating the quote variation from rounded quotes. A way of rounding can consist in considering only the whole number portion of the quote. Another way of rounding consists in cutting the end of the decimal portion.

2.E—Methods and Processes Enabling the Game Organiser to Pattern the Size of Variable Amounts Paid to the Winners According to a Predefined Average Amount Level The general method consists in taking into account, for every game period of time, the volatility of the quoted security in order to determine the corresponding value point. Patterning the size of the variable amounts paid according to an average amount aims at having the point value vary in an inverse proportion of the number of points the game organiser expects to have to pay for.

The general method consists in proceeding, for each security, according to the following steps:

1—First, calculation of the previsional spread $S_{t+1}$ of the quoted security for the t+1 period. A Gauss law is used in order to estimate the distribution of the quoted security. It is called p (t; m; σ.), t being the sliding horizon, m the average and σ the standard deviation. The spread can be estimated to 4σ multiplied by the projected quoted value of the security for the n+1 period of time.

2—Secondly, expression of the point value in proportion of the previsional spread by a formula $VP_{t+1}=K \cdot S_{t+1}$ with K being a constant to be parametered.

3—Thirdly, calculation of the parametered constant K using L, $E_t$ et $P_t$ with L being the average gain amount on the base period of time, $E_t$ being the mathematical expectation of the number of points to pay for on period t, and $P_t$ being the probability of winners existence on period t.

In order to do so, one considers that L equals the sum, for all values t, of $E_t$ multiplied by $VP_t$ and divided by the sum, for all values t, of $P_t$. Once $VP_t$ is substituted by K multiplied by $S_t$, one can then calculate the value of K for the period t from the values of L, $E_t$, $P_t$, and $S_t$.

2.F—Methods and Processes Enabling the Game Organiser to Measure Game Performances of Each Player The general method consists in measuring the quality of the forecasts expressed by the players by measuring the difference between the forecasts and the effective level of quotes.

A process consists in calculating the difference between the forecast and the effective level of the quote for a security, expressed in points and in absolute value. The closer this number stands to zero, the better the forecast is.

Another process consists in applying the hereabove process, but without considering the decimal portion of the numbers.

Another process consists in applying the hereabove process, but with rounded values.

For a bet combining several forecasts, the process consists in cumulating, for all the forecasts included in the bet and in absolute value, the difference between the forecasts and the effective quote levels using any of the hereabove described processes.

The process of <<scoring>> aims at giving a quality measure to each bet (<<the score>>), as defined hereabove, and to provide the player with his historical series of scores for him to be able to appreciate his own daily performance and the evolution of his performance through time. It can also enable the game organiser to make comparisons between players and between bets.

The process of <<rating>> consists in giving a level to a player as soon as he has bet regularly on the last x market days. It consists in determining several rating categories corresponding to a minimum scoring level obtained during a base period of time. For example, rating categories can be <<beginner>>, <<expert>>, etc. The daily scores of the player are cumulated through the base period of time, and this cumulated score gives the player the opportunity to be admitted to the corresponding rating category.

The process of <<ranking>> consists in giving a rank to a player as soon as he has bet regularly on the last y market days. The population of all the players who have regularly bet on the last y market days is considered. For each player, the daily scores are cumulated through the base period of time. The players are then ranked from the first to the last one according to their cumulated score. The ranking of each player is expressed as a percentage of the considered population of players, i.e. top 1%, top 2%, . . . top n % of the considered population of players.

3—A Detailed Particular Embodiment of the Game with its Methods and Processes

The following part explains the mathematical and statistical elements used to operate a financial forecasting game making use of combined financial assets and functioning with three stock market indexes.

3.A.1—Game Principles

The general principle of the game is to express daily forecasts on the level of three main stock market indexes, as quoted at the close of the following market session.

Within one single daily bet, each player has three ways of winning:

game A—three indexes, including the decimal portion, on one day

The player has to forecast three exact indexes, including the decimal portion of the indexes. Each winner is paid a fixed amount which is announced in advance, game B—three indexes, without the decimal portion, on one day It is like game A, but the indexes are considered only for their whole number portion. Each winner is paid a variable amount which corresponds to the real indexes point variations. To calculate the level of the amount, the interday point variations are added for the three indexes, without considering the decimal portions, in absolute value, and then multiplied by a daily point value which was announced on the previous day by the game organiser, game C—three different indexes, without the decimal portion, over three days It is like game B, but extended over three sliding consecutive days. A winning trio is composed of an index of each kind. Any index found in a bet is considered to be found for the bets of the following two days as well. A day without playing, or any gain occurring in games A, B or C provoke a <<reset>> and erase the already found indexes. Each winner is paid a fixed amount which is announced in advance.

Games B and C can be run with a tolerance margin expressed in index points, and announced in advance. For example, when the game organiser announces a tolerance margin of x points, he accepts as a correct forecast the exact index for its whole number portion i, but he also considers as correct the forecasts i+1, i+2, . . . i+x and the forecasts i−1, i−2, . . . i−x.

3.A.2—Issues of the Mathematical and Statistical Approach

A formal mathematical and statistical approach is useful:

for marketing credibility. The game concept must be able to show a sufficient and mastered number of winners. A probability study must enable the game organiser to estimate the number of winners by game type, for financial feasibility. The game proposes to pay winners with individual gains and it is a major issue to estimate the financial risks taken by the game organiser. Moreover, financial budgeting needs to estimate the amounts and to control the costs per bet. A statistical calculation of mathematical expectations of payments to the winners has to estimate the expected financial risks and budgets by game type, for operations steering. Game B announces a point value each day for the following stock market session. The quotation system must enable the game organiser to best anticipate the market situations by taking the volatility into account. The mathematical formula giving the point value price has to be explicated.

More generally, the capacity to achieve those works depends on the prior determination of a specific probability model. As a comparison, a lotto drawing considers a predetermined number of equivalent possibilities. The stock market indexes can not be considered in the same way as one can understand that their variations possibilities are theoretically infinite and non equivalent. The explicitation of a specific probabilistic approach, effective and modelled, is a prerequisite.

3.A.3—Following Contents Presentation

The following contents match the hereabove issues:

the part <<Methods and processes enabling the game organiser to determine the probability law>> presents the probabilistic model used and the basic calculation formulas it enables the game organiser to use, the part <<Methods and processes enabling the game organiser to validate and optimise the model>> analyses the CAC, the Dow Jones and the Nasdaq indexes exhaustively through a 13 year period of time. It measures the indexes correlation, estimates the forecasting capacity of the probability model, and then optimises it using a sliding horizons method, the part <<Methods and processes enabling the game organiser to calculate the combinations>> presents the formulas enabling the game organiser to estimate the expected winners number by game type, the part <<Methods and processes enabling the game organiser to calculate the risks>> presents the formulas enabling the game organiser to estimate financial risks and budgets by game type, the part <<Methods and processes enabling the game organiser to calculate the steering variables>> presents the formula of daily point value quotation along with the calculation formula enabling the game organiser to use tolerance margins in games B and C.

3.B—Methods and Processes Enabling the Game Organiser to Determine the Probability Law This part aims at expliciting the processes of reasoning and calculating which enable the game organiser to quantify occurrence probabilities and forecast probabilities of a stock index level.

3.B.1—Preliminary Note

Bachelier was the first to explain to Poincare the theory according to which stock prices evolution follow a Gauss Law.

Mandelbrot, Fields Medal, precised that this evolution follow Gauss Laws with dimensions which vary through time.

3.B.2—Probability of Values Occurrence (Expression of Formula 1-2)

Let us consider a given stock index and let t be its interday variation:

$$t = \frac{C_t}{C_{t-1}} - 1$$

with $C_t$ representing the quote value at the close of the market on day t
and $C_{t-1}$ representing the quote value at the close of the market on day t−1

In accordance with Bachelier and Mandelbrot works, one can notice that the series through time of the random variable t forms a normal distribution with an average <<m>> and a standard deviation <<σ>>.

Conventionally, let this normal law be called p(t) with:

$$p(t) = p(t, m, \sigma) = \frac{1}{\sigma\sqrt{2\pi}} e^{\frac{-(t-m)^2}{2\sigma^2}}$$

So calculated, p(t) is the probability distribution law for a given index to occur to such or such level. It is the probability of the index <<taking>> a specific value.

3.B.3—Probability of Winners Existence (Expression of Formula 1-3)

Let us consider P being the total probability for the game organiser to pay a winner:

$$P = \sum_{indexes} p(t) \cdot p(j)$$

with p(t) being the probability an index level occurs
and p(j) being the probability for one player to position his bet precisely on this index level.

As game strategies have an impact on the game organiser, we are led to make an assumption on the distribution of the bets. Intuitively for the player, all positions are possible but they do not have the same probability to occur. We can most likely anticipate various situations and players tending to have a trend following behaviour. Our work hypothesis is a bet distribution similar to the index distribution.

$$P = \sum_{indexes} p(t) \cdot p(j)$$
$$= \sum_{indexes} p^2(t)$$
$$p(t) = \frac{1}{\sigma\sqrt{2\pi}} e^{\frac{-(t-m)^2}{2\sigma^2}}$$
$$\text{then } p^2(t) = \left[\frac{1}{\sigma\sqrt{2\pi}} e^{\frac{-(t-m)^2}{2\sigma^2}}\right]^2$$
$$= \left[\frac{1}{\sigma\sqrt{2\pi}}\right]^2 e^{\frac{-(t-m)^2}{\sigma^2}}$$
$$= \frac{1}{2\sigma\sqrt{\pi}} \left[\frac{1}{\frac{\sigma}{\sqrt{2}}\sqrt{2\pi}} e^{\frac{-(t-m)^2}{2\left(\frac{\sigma}{\sqrt{2}}\right)^2}}\right]$$
$$p^2(t) = \frac{1}{2\sigma\sqrt{\pi}} \varphi\left(t, m, \frac{\sigma}{\sqrt{2}}\right)$$
$$\Phi(t) = \int_{-\infty}^{t} p^2(t)dt$$
$$= \int_{-\infty}^{t} \frac{1}{2\sigma\sqrt{\pi}} \varphi\left(t, m, \frac{\sigma}{\sqrt{2}}\right)dt$$

3.C—Methods and Processes Enabling the Game Organiser to Validate and Optimise the Model This part aims at expliciting the processes of reasoning and calculating which enable the game organiser to validate the probability law used and to optimise it.

3.C.1—Indexes Correlation

Let us consider the interday variations of three main stock market indexes: CAC 40, Dow Jones Industrial Average and Nasdaq Composite.

$$t = \frac{C_t}{C_{t-1}} - 1$$

with $C_t$ representing the quote value at the close of the market on day t
and $C_{t-1}$ representing the quote value at the close of the market on day t−1

Method used:
1—base period of time is 13 years, from Jan. 26, 1988 to Feb. 7, 2001
2—calculation of daily interday variations for each index
3—corrective substitutions of indexes on public holiday
4—correlation coefficients two by two using the formula:

$$\text{Correlation}(X; Y) = \frac{\text{Cov}(X; Y)}{\sigma_x \sigma_y}$$

The principle considered is a possible daily bet on three indexes as soon as one of the three indexes at least is active. This is the case when public holidays in France and in the United States do not match. In that case, the unexisting index value is substituted with that of the following existing index value.

| Results: | |
|---|---|
| base of 3366 sessions correlations | (CAC; Dow) = 69.5% |
|  | (CAC; Nasdaq) = 72.2% |
|  | (Dow; Nasdaq) = 74.7% |

Conclusion:
Correlation between the three indexes, but not to a sufficient degree to be considered as effective for the searched precision levels.

3.C.2—Level of Forecasting Capacity

Let us consider the CAC 40 index through 12 years, from Jan. 3, 1989 to Feb. 7, 2001. Let t be the random variable of interday variations.

Through that period of time:
n=3026 market sessions
m=0.05%=
σ=1.22%

Using a retrospective method, we have analysed the forecasting capacity of the distribution law φ(t, m, σ) as follows:
Method used:
1—division of the probabilistic set into nine base sub-segments. The bounds of theses sub-segments are positioned so as to capture the sub-segments of the normal law φ(t, m, σ) by slice of 10% until 90%.
2—retrospectively through the period of time, daily forecast of a target value for the following day. The forecast is obtained by taking the previous day's close value and projecting it by using the average m.
3—comparison of obtained target values with the bounds of base sub-segments. A breakdown allocates each target value to <<its>> sub-segment.
4—totalisation of the situations through the period of time. One can then compare the shape of the two probability distributions and measure the difference between the forecasting method used and a theoretical normal law.

On 3026 trading sessions, each slice of 10% represents a population comprising around 300 cases. This level seems to be a good compromise between the sharpness desired for the sub-segmentation and the minimum size desired for samples.
Results:
base of 3026 sessions CAC 40
totalisation of differences in absolute value: 11%

|  | Slices of sub-segment | | | | | | | | | |
|---|---|---|---|---|---|---|---|---|---|---|
|  | 1 | 2 | 3 | 4 | 5 | 6 | 7 | 8 | 9 | Total |
| Normal law | 10% | 10% | 10% | 10% | 10% | 10% | 10% | 10% | 10% | 90% |
| Tested law | 13% | 11% | 11% | 11% | 11% | 9% | 10% | 9% | 7% | 91% |
| Difference | 3% | 1% | 1% | 1% | 1% | 1% | 0% | 1% | 3% | 11% |

Conclusion:
The forecasting capacity is comparable to that of a normal law by around 89%.

3.C.3—Optimisation Through Sliding Horizons

Let us consider a similar method, but applied to sliding horizons. The tested forecasting capacity is no longer that of a distribution with a fixed average and standard deviation but that of families of normal laws with a sliding horizon <<x>>.
Method used:
1—retrospectively through the studied period of time, daily calculation of sliding averages mx, and of sliding standard deviations σx, for the last x days known, x being the sliding horizon.
2—division into nine base sub-segments of 10% corresponding to the normal laws σ(t, mx$_t$, σx$_t$), forecast of target values by projecting the sliding average mx$_t$, allocation of each target value to <<its>> sub-segment.
3—totalisation of the situations through the period of time, by sub-segment, and then totalisation of the differences in absolute value. The minimum number indicates the sliding horizon whose forecasting capacity is most comparable to a normal distribution.
Results:
base of 3026 sessions CAC 40
minimum difference obtained for a sliding horizon of 16 days: 3.8%
Conclusion:
For a tested sliding horizon of 16 days, the forecasting capacity is comparable to that of a normal law by more than 96%.

3.D—Methods and Processes Enabling the Game Organiser to Calculate the Combinations This part aims at expliciting the processes of reasoning and calculating which enable the game organiser to quantify forecasting probabilities of complex events from forecasting probabilities of single events.

3.D.1—Probability of the Couple (3 Indexes; 1 Day)/(Expression of Formula 3-1)

Let
$p_1$ represent the occurrence probability of the event $a_1$
$p_2$ represent the occurrence probability of the event $a_2$
$p_3$ represent the occurrence probability of the event $a_3$
where
$a_1$ is the event <<find index 1 on day t>>
$a_2$ is the event <<find index 2 on day t>>
$a_3$ is the event <<find index 3 on day t>>
The three events are supposed to be independent.

$$p(a) = p(a_1 \cap a_2 \cap a_3)$$
$$= p(X \cap a_3)$$
$$= p(X)p(a_3)$$
$$= p(a_1)p(a_2)p(a_3)$$
$$= p_1 p_2 p_3$$

3.D.2—Probability of the Couple (1 Index; 3 Days)/(Expression of Formula 3-2)

Let
$p_1$ represent the occurrence probability of the event $b_1$
$p_2$ represent the occurrence probability of the event $b_2$
$p_3$ represent the occurrence probability of the event $b_3$
where
$b_1$ is the event <<find the index i on day $t_1$>>
$b_2$ is the event <<find the index i on day $t_2$>>
$b_3$ is the event <<find the index i on day $t_3$>>
The three events are supposed to be independent.

$$p(b) = p(b_1 \cup b_2 \cup b_3)$$
$$= p(X \cup b_3)$$
$$= p(X) + p(b_3) - p(X \cap b_3)$$
$$p(X) = p(b_1 \cup b_2)$$
$$= p(b_1) + p(b_2) - p(b_1 \cap b_2)$$
$$= p_1 + p_2 - p_1 p_2$$
$$p(b) = (p_1 + p_2 - p_1 p_2) + p_3 - (p_1 + p_2 - p_1 p_2)p_3$$
$$= p_1 + p_2 + p_3 - p_1 p_2 - p_1 p_3 - p_2 p_3 + p_1 p_2 p_3$$

3.D.3—Probability of the Couple (3 Indexes; 3 Days)/(Expression of Formula 3-3)

Let
$p_{b1}$ represent the occurrence probability of the event $b_1$
$p_{b2}$ represent the occurrence probability of the event $b_2$
$p_{b3}$ represent the occurrence probability of the event $b_3$
where
$b_1$ is the event <<find at least one index 1 on $t_1$, $t_2$ or $t_3$>>
$b_2$ is the event <<find at least one index 2 on $t_1$, $t_2$ or $t_3$>>
$b_3$ is the event <<find at least one index 3 on $t_1$, $t_2$ or $t_3$>>
Then $$p(c) = p_{b1} p_{b2} p_{b3} - p(e)$$

$p_{b1}$, $p_{b2}$ $et$ $p_{b3}$ are calculated using the formula 1-3, expressed in the hereabove paragraph <<Methods and processes enabling the game organiser to determine the probability law/subparagraph probability of winners existence>> (3.B.3).

Moreover,
Let
$p_{e1}$ represent the occurrence probability of the event $e_1$
$p_{e2}$ represent the occurrence probability of the event $e_2$
$p_{e3}$ represent the occurrence probability of the event $e_3$
where
$e_1$ is the event <<find the three indexes on $t_1$>>
$e_2$ is the event <<find the three indexes on $t_2$>>
$e_3$ is the event <<find the three indexes on $t_3$>>

$$p(e) = p(e_1 \cup e_2 \cup e_3)$$
$$= p_{e1} + p_{e2} + p_{e3} - p_{e1}p_{e2} - p_{e1}p_{e3} - p_{e2}p_{e3} + p_{e1}p_{e2}p_{e3}$$

$p_{e1}$, $p_{e2}$ $et$ $p_{e3}$ are calculated using the formula 1-2, expressed in the hereabove paragraph <<Methods and processes enabling the game organiser to determine the probability law/subparagraph probability of values occurrence>> (3.B.2).

3.E—Methods and Processes Enabling the Game Organiser to Calculate the Risks

This part aims at expliciting the processes of reasoning and calculating which enable the game organiser to quantify the mathematical expectations of payments to winners, whether fixed or variable, and then to combine them.

3.E.1—Mathematical Expectation of Fixed Payment

Let
F represent the fixed payment due to each winner
and
p the probability for the game organiser to have to pay a winner
then $$E(F) = p \cdot F$$

3.E.2—Elementary Mathematical Expectation of Variable Payment

Let us consider a forecast concerning only one index
Let
|t| be the variable payment due to each winner
|t| being the interday variation in points and in absolute value $$E(|t|) = \int_{-\infty}^{+\infty} |t| p^2(t) dt$$
$$= \int_{-\infty}^{+\infty} |t| \left[ \frac{1}{\sigma\sqrt{2\pi}} e^{-\frac{(t-m)^2}{2\sigma^2}} \right]^2 dt$$
$$= \left[ \frac{1}{\sigma\sqrt{2\pi}} \right]^2 \int_{-\infty}^{+\infty} |t| e^{-\frac{(t-m)^2}{\sigma^2}} dt$$
$$= \frac{1}{2\pi\sigma^2} \int_{-\infty}^{+\infty} |t| e^{-\frac{(t-m)^2}{\sigma^2}} dt$$

Development 1/5

Change of variable: $\frac{u^2}{u} = \frac{(t-m)^2}{\sigma^2}$

We have then:

$$\Leftrightarrow u^2\sigma^2 = (t-m)^2 \cdot 2$$

$$\Leftrightarrow u\sigma = (t-m)\sqrt{2}$$

$$\Leftrightarrow \frac{u\sigma}{\sqrt{2}} = (t-m)$$

$$\Leftrightarrow t = \frac{u\sigma}{\sqrt{2}} + m$$

$$\Leftrightarrow t = \frac{\sigma}{\sqrt{2}}\left(u + \frac{m\sqrt{2}}{\sigma}\right)$$

Also:

$$dt = d\left(\frac{u\sigma}{\sqrt{2}} + m\right)$$

$$dt = \frac{\sigma}{\sqrt{2}} du + dm$$

$$dt = \frac{\sigma}{\sqrt{2}} du$$

The equation becomes:

$$E(|t|) = \frac{1}{2\pi\sigma^2}\int_{-\infty}^{+\infty} |t| e^{\frac{-(t-m)^2}{\sigma^2}} dt$$

$$= \frac{1}{2\pi\sigma^2}\int_{-\infty}^{+\infty} |t| e^{\frac{-u^2}{2}} dt$$

$$= \frac{1}{2\pi\sigma^2}\int_{-\infty}^{+\infty} \left|\frac{\sigma}{\sqrt{2}}\left(u + \frac{m\sqrt{2}}{\sigma}\right)\right| e^{\frac{-u^2}{2}} dt$$

$$= \frac{1}{2\pi\sigma^2}\int_{-\infty}^{+\infty} \frac{\sigma}{\sqrt{2}}\left|u + \frac{m\sqrt{2}}{\sigma}\right| e^{\frac{-u^2}{2}} \frac{\sigma}{\sqrt{2}} du$$

$$= \frac{1}{2\pi\sigma^2} \frac{\sigma^2}{\sigma} \int_{-\infty}^{+\infty} \left|u + \frac{m\sqrt{2}}{\sigma}\right| e^{\frac{-u^2}{2}} du$$

$$= \frac{1}{4\pi}\int_{-\infty}^{+\infty} \left|u + \frac{m\sqrt{2}}{\sigma}\right| e^{\frac{-u^2}{2}} du$$

Development 2/5

Equation fractionating into two terms depending on the sign of the absolute value:

$$\left|u + \frac{m\sqrt{2}}{\sigma}\right| = u + \frac{m\sqrt{2}}{\sigma} \text{ if } u + \frac{m\sqrt{2}}{\sigma} > 0 \Leftrightarrow u > -\frac{m\sqrt{2}}{\sigma}$$

$$\left|u + \frac{m\sqrt{2}}{\sigma}\right| = -u - \frac{m\sqrt{2}}{\sigma} \text{ if } u + \frac{m\sqrt{2}}{\sigma} < 0 \Leftrightarrow u < -\frac{m\sqrt{2}}{\sigma}$$

The equation becomes:

$$E(|t|) = \frac{1}{4\pi}\int_{-\infty}^{+\infty}\left|u + \frac{m\sqrt{2}}{\sigma}\right| e^{\frac{-u^2}{2}} du$$

$$E(|t|) = \frac{1}{4\pi}\left[\int_{-\infty}^{-\frac{m\sqrt{2}}{\sigma}} -\left(u + \frac{m\sqrt{2}}{\sigma}\right) e^{\frac{-u^2}{2}} du + \int_{-\frac{m\sqrt{2}}{\sigma}}^{+\infty} \left(u + \frac{m\sqrt{2}}{\sigma}\right) e^{\frac{-u^2}{2}} du\right]$$

Fractionating of both terms of the equation to zero through vectorial sum:

The equation becomes:

$$E(|t|) = \frac{1}{4\pi}\bigg[\int_{-\infty}^{0} -\left(u + \frac{m\sqrt{2}}{\sigma}\right) e^{\frac{-u^2}{2}} du + \quad \text{term A}$$

$$\int_{0}^{-\frac{m\sqrt{2}}{\sigma}} -\left(u + \frac{m\sqrt{2}}{\sigma}\right) e^{\frac{-u^2}{2}} du + \quad \text{term B}$$

$$\int_{-\frac{m\sqrt{2}}{\sigma}}^{0} \left(u + \frac{m\sqrt{2}}{\sigma}\right) e^{\frac{-u^2}{2}} du + \quad \text{term C}$$

$$\int_{0}^{+\infty} \left(u + \frac{m\sqrt{2}}{\sigma}\right) e^{\frac{-u^2}{2}} du\bigg] \quad \text{term D}$$

Development 3/5

Through vectorial sum, we have B+C=2 B $$E(|t|) = \frac{1}{4\pi}\bigg[\int_{-\infty}^{0} -\left(u + \frac{m\sqrt{2}}{\sigma}\right) e^{\frac{-u^2}{2}} du + \quad \text{term A}$$

$$2\int_{0}^{-\frac{m\sqrt{2}}{\sigma}} -\left(u + \frac{m\sqrt{2}}{\sigma}\right) e^{\frac{-u^2}{2}} du + \quad \text{term B + C}$$

$$\int_{0}^{+\infty} \left(u + \frac{m\sqrt{2}}{\sigma}\right) e^{\frac{-u^2}{2}} du\bigg] \quad \text{term D}$$

$$\int_{-\infty}^{+\infty} \left(u + \frac{m\sqrt{2}}{\sigma}\right) e^{\frac{-u^2}{2}} du$$

$$E(|t|) = \frac{1}{4\pi}\bigg[-\int_{-\infty}^{0} u e^{\frac{-u^2}{2}} du - \frac{m\sqrt{2}}{\sigma}\int_{-\infty}^{0} e^{\frac{-u^2}{2}} du -$$

$$2\int_{0}^{-\frac{m\sqrt{2}}{\sigma}} u e^{\frac{-u^2}{2}} du -$$

$$\frac{2m\sqrt{2}}{\sigma}\int_{0}^{-\frac{m\sqrt{2}}{\sigma}} e^{\frac{-u^2}{2}} du +$$

$$\int_{0}^{+\infty} u e^{\frac{-u^2}{2}} du + \frac{m\sqrt{2}}{\sigma}\int_{0}^{+\infty} e^{\frac{-u^2}{2}} du\bigg]$$

$$E(|t|) = \frac{1}{4\pi}\bigg[\int_{0}^{+\infty} u e^{\frac{-u^2}{2}} du - \int_{-\infty}^{0} u e^{\frac{-u^2}{2}} du -$$

$$\frac{m\sqrt{2}}{\sigma}\int_{-\infty}^{0} e^{\frac{-u^2}{2}} du + \frac{m\sqrt{2}}{\sigma}\int_{0}^{+\infty} e^{\frac{-u^2}{2}} du -$$

$$2\int_{0}^{-\frac{m\sqrt{2}}{\sigma}} u e^{\frac{-u^2}{2}} du -$$

$$\frac{2m\sqrt{2}}{\sigma}\int_{0}^{-\frac{m\sqrt{2}}{\sigma}} e^{\frac{-u^2}{2}} du\bigg]$$

$$E(|t|) = \frac{1}{4\pi}\bigg[\int_{0}^{+\infty} u e^{\frac{-u^2}{2}} du + \int_{0}^{+\infty} u e^{\frac{-u^2}{2}} du -$$

$$2\int_{0}^{-\frac{m\sqrt{2}}{\sigma}} u e^{\frac{-u^2}{2}} du -$$

-continued $$\frac{2m\sqrt{2}}{\sigma}\int_0^{-\frac{m\sqrt{2}}{\sigma}} e^{\frac{-u^2}{2}} du\bigg]$$

$$E(|t|) = \frac{1}{4\pi}\bigg[2\int_0^{+\infty} ue^{\frac{-u^2}{2}} du -$$

$$2\int_0^{-\frac{m\sqrt{2}}{\sigma}} ue^{\frac{-u^2}{2}} du -$$

$$\frac{2m\sqrt{2}}{\sigma}\int_0^{-\frac{m\sqrt{2}}{\sigma}} e^{\frac{-u^2}{2}} du\bigg]$$

Development 4/5
Calculation of term E $$\int_0^{+\infty} ue^{\frac{-u^2}{2}}$$

tends towards 1 ⇔ the term E tends towards 2

Calculation of term F
Change of variable:

$$v = \frac{u^2}{2}$$

We have then $$dv = \frac{2udu}{2} = udu$$

when $u = \frac{-m\sqrt{2}}{\sigma}$ $$v = \frac{u^2}{2} = \frac{1}{2}\left(\frac{-m\sqrt{2}}{\sigma}\right)^2$$
$$= \frac{1}{2}\left(\frac{2m^2}{\sigma^2}\right)$$
$$= \frac{m^2}{\sigma^2}$$

$$\text{Term } F = -2\int_0^{-\frac{m\sqrt{2}}{\sigma}} ue^{\frac{-u^2}{2}} du$$
$$= -2\int_0^{\frac{m^2}{\sigma^2}} e^{-v} dv$$

or $\int_0^x e^{-v} dv = 1 - e^{-x}$ $$\text{Term } F = -2\left[1 - e^{-\frac{m^2}{\sigma^2}}\right]$$

Calculation of term G
Change of variable by multiplying by $$\sqrt{2\pi}\,\frac{1}{\sqrt{2\pi}}$$

term E term F term G $$\text{Term } G = -\frac{2m\sqrt{2}}{\sigma}\int_0^{\frac{-m\sqrt{2}}{\sigma}} e^{\frac{-u^2}{2}} du$$

$$= -\frac{2m\sqrt{2}}{\sigma}\sqrt{2\pi}\int_0^{\frac{-m\sqrt{2}}{\sigma}} \frac{1}{\sqrt{2\pi}} e^{\frac{-u^2}{2}} du$$

$$= -\frac{4m\sqrt{\pi}}{\sigma}\left[\varphi\left(,\frac{-m\sqrt{2}}{\sigma},0,1\right) - \varphi(0,0,1)\right]$$

$$= -\frac{4m\sqrt{\pi}}{\sigma}\left[\varphi\left(,\frac{-m\sqrt{2}}{\sigma},0,1\right) - \frac{1}{2}\right]$$

$$\text{Term } G = -\frac{4m\sqrt{\pi}}{\sigma}\varphi\left(\frac{-m\sqrt{2}}{\sigma},0,1\right) + \frac{2m\sqrt{2}}{\sigma}$$

Development 5/5

$$E(|t|) = \frac{1}{4\pi}\left[2 - 2\left[1 - e^{\frac{-m^2}{\sigma^2}}\right] - \frac{4m\sqrt{\pi}}{\sigma}\varphi\left(\frac{-m\sqrt{2}}{\sigma^2},0,1\right) + \frac{2m\sqrt{\pi}}{\sigma}\right] \quad \text{term E}$$

$$E(|t|) = \frac{1}{4\pi}\left[2 - 2 + 2e^{\frac{-m^2}{\sigma^2}} - \frac{4m\sqrt{\pi}}{\sigma}\varphi\left(\frac{-m\sqrt{2}}{\sigma},0,1\right) + \frac{2m\sqrt{\pi}}{\sigma}\right] \quad \text{term F}$$

$$E(|t|) = \frac{1}{2\pi}e^{\frac{-m^2}{\sigma^2}} - \frac{m}{\sigma\sqrt{\pi}}\varphi\left(\frac{-m\sqrt{2}}{\sigma},0,1\right) + \frac{m}{2\sigma\sqrt{\pi}} \quad \text{term G}$$

3.E.3—Combined Mathematical Expectation of Variable Payment

3.E.3.A—Combination with Two Indexes $$E(|X| + |Y|) = \sum_{i,j}[|x_i| + |y_j|] \cdot k_{xi:yj}$$

where $k_{xi:yj}$ is the probability to have $x_i$ and $y_j$ together $$= \sum_{i,j}[|x_i| + |y_j|] \cdot f_{xi} \cdot g_{yj}$$

where $f_{xi}$ is the probability to have $x_i$ and $g_{yj}$ is the probability to have $y_j$ because $X$ and $Y$ are supposed to be independent $$= \sum_{i,j}[|x_i| \cdot f_{xi} \cdot g_{yj} + |y_j| \cdot f_{xi} \cdot g_{yj}]$$

$$= \sum_{i,j}|x_i| \cdot f_{xi} \cdot g_{yj} + \sum_{i,j}|y_j| \cdot f_{xi} \cdot g_{yj}$$

$$= \sum_j g_{yj}\left[\sum_i |x_i| \cdot f_{xi}\right] + \sum_i f_{xi}\left[\sum_j |y_j| \cdot g_{yj}\right]$$

$$= \left[\sum_i |x_i| \cdot f_{xi}\right] \cdot \left[\sum_j g_{yj}\right] + \left[\sum_j |y_j| \cdot g_{yj}\right] \cdot \left[\sum_i f_{xi}\right]$$

-continued $$= E(|X|) \cdot \sum_j g_{yj} + E(|Y|) \sum_i f_{xi}$$

where $E(|X|)$=mathematical expectations for index X
$E(|Y|)$=mathematical expectations for index Y
calculated using the formula 3-2, expressed in the hereabove paragraph <<Methods and processes enabling the game organiser to calculate the risks/Elementary mathematical expectation of variable payment>> (3.E.2).

and $\sum_i f_{xi}$ = probability of forecast of an index X $\sum_j g_{yj}$ = probability of forecast of an index Y calculated using the formula 1-3, expressed in the hereabove paragraph <<Methods and processes enabling the game organiser to determine the probability law/subparagraph probability of winners existence>> (3.B.3).

3.E.3.B—Combination with Three Indexes
Using the same method:

$$E(|X|+|Y|+|Z|) = E(|X|) \cdot \sum_j g_{yj} \cdot \sum_k l_{zk} +$$
$$E(|Y|) \cdot \sum_i f_{xi} \cdot \sum_k l_{zk} +$$
$$E(|Z|) \cdot \sum_i f_{xi} \cdot \sum_j g_{yj}$$

where $E(|X|)$=mathematical expectations for index X
$E(|Y|)$=mathematical expectations for index Y
$E(|Z|)$=mathematical expectations for index Z
calculated using the formula 3-2, expressed in the hereabove paragraph <<Methods and processes enabling the game organiser to calculate the combinations/subparagraph probability of the couple (1 index, 3 days)>> (3.D.2).

and $\sum_i f_{xi}$ = probability of forecast of an index X $\sum_j g_{yj}$ = probability of forecast of an index Y $\sum_k l_{zk}$ = probability of forecast of an index Z calculated using the formula 1-3, expressed in the hereabove paragraph <<Methods and processes enabling the game organiser to determine the probability law/subparagraph probability of winners existence>> (3.B.3).

3.F—Methods and Processes Enabling the Game Organiser to Calculate the Steering Variables This part aims at expliciting the complementary elements of calculation concerning daily quotation of point value, sliding horizons optimisation, and correlation level of indexes.

3.F.1—Daily Quotation of Point Value

Quotation with three indexes:
Let
$VP_{t+1}$ be the point value quoted on t for t+1
$S_{1;\,t+1}$ be the previsional spread of index 1 on t+1
$S_{2;\,t+1}$ be the previsional spread of index 2 on t+1
$S_{3;\,t+1}$ be the previsional spread of index 3 on t+1
and
K a constant to be parametered
then $$VP_{t+1} = K \cdot S_{t+1}$$

$$S_{t+1} = \sum_{i=1}^{3} S_{i:t+1}$$

Calculation of the spreads for each of the three indexes:
Let
$C_t$ represent the quotation at the close of the market on day t
$p(t; m; \sigma.)$ the normal distribution law used
and
$S_{t+1}$ the previsional average spread of the index on t+1
$C_{target}$ the average target value of the quotation at the close of the market on day t+1 then $S_{t+1} = 4\sigma \cdot C_{target}$
$4\sigma \cdot (1+m)C_t$

Calculation of the parametered constant K:
Let
$E_t$=$E(|X|+|Y|+|Z|)$ be the mathematical expectation of the points to pay for on t
$P_t$=$p_1\,p_2\,p_3$ be the probability of having winners on t
and
L be the average gain amount on a base period of time then $L = \dfrac{\sum_t E_t \cdot VP_t}{\sum_t P_t}$ $$= \dfrac{\sum_t E_t \cdot K \cdot S_t}{\sum_t P_t}$$

$$= K \cdot \dfrac{\sum_t E_t \cdot S_t}{\sum_t P_t}$$

so $K = L \cdot \dfrac{\sum_t P_t}{\sum_t E_t \cdot S_t}$

3.F.2—Tolerance Margins

Let us consider the case where the game organiser agrees to pay for correct forecasts, those including a tolerance margin.

This case is irrelevant for forecasts required with the exact decimal portion.

For the forecasts which are required without the decimal portion, we have considered the following solution:
1—the tolerance margins are expressed in points, whether above or under the index 2—as long as tolerance margins are small, gradual reasoning is acceptable to estimate probabilities. The probability of forecast of the index is a good approximation of the other tolerated forecasts.

For example, a tolerance margin announced for <<one point>> corresponds to three acceptable forecasts $C_{t+1}$, $(C_{t+1}+1)$, or $(C_{t+1}-1)$.

Let $p_1$ be the occurrence probability of the event <<forecast $C_{t+1}$>>

$p_2$ be the occurrence probability of the event <<forecast $(C_{t+1}+1)$>>

$p_3$ be the occurrence probability of the event <<forecast $(C_{t+1}-1)$>>

$$\text{Then } p_1 \approx p_2 \approx p_3$$
$$P = p_1 + p_2 + p_3$$
$$\approx 3p_1$$

4—Other particular embodiments of the game, using similar methods and processes as in parts 2 and 3 hereabove.

Other particular embodiments of the game can be composed with three indexes, as in part 3 hereabove, but with other major American and worldwide indexes, namely:

the Dow Jones Industrial Average, the Nasdaq Composite, and the S&P 500, the Dow Jones Industrial Average, the Eurostoxx 50, and the Nikkei 225.

More generally, the game can be composed with several indexes taken from the leading publicly known indexes in the world, namely:

Americas: New York (DJ Ind, DJ Transport, DJ Services, S&P 500, S&P Gold, Nasdaq, Russell 2000, Wilshire 5000), Toronto (Composite), Buenos Aires (Merval), Mexico (Immex), Santiago (General), Sao Paulo (Bovespa), Asia: Tokyo (Nikkei 225, Topix), Shanghai (Shanghai B), Shenzhen (Shenzhen B), Hong Kong (Hang Seng), Singapore (Strait Times), Bangkok (Set 50), Seoul (Kospi 200), Kuala Lumpur (KLSE), Taipei (Weighted Index), Djakarta (Composite), Mumbai (BSE Dollex), Tel Aviv (Maof 25), Africa/Pacific: Sydney (General, Asx 20), Wellington (DJ NZ), Johannesburg (Industrial, Gold mines), Casablanca (Masi), Cairo PanEuropean Indexes: Euronext (Euronext 100, Next 150, Alternext Allshares,) Investir (Vm 100), Eurofirst (Eurofirst 80, Eurofirst 100), EPRA (Epra Zone Euro), DJ Stoxx (Euro 50, Europe 50, Europe Large, Euro Large), Eurotop (Eurotop 100, Eurotop 300), MSCI (Msci Euro Index, Msci Pan-Euro), Zone Euro Indexes: Amsterdam (Aex), Brussels (Bel 20, General), Dublin (Iseq Overall), Frankfurt (X-Dax-30), Lisboa (Psi 20 Index), Madrid (Ibex 35, General), Milano (Mibtel, Mib 30), Paris (Cac 40, Next 20, Mid 100, Small 90, Mid&Small 190, Itcac 20), Vienna (Atx), Helsinki (Hex Index), Out of Zone Euro Indexes: Budapest (Bux), Copenhagen (Hfx), London (FTSE 100, FTSE 250, Gold Mines), Moscow (RTS Dollar), Oslo (Obx Industrial), Prag (Px 50), Stockholm (Omx), Warsaw (Wg 20), Zurich (SMI), Morgan Stanley Capital International geographical indexes, whether Global, regional or per country, Dow Jones sectorial indexes, ICB sectorial indexes.

Other particular embodiments of the game can be composed with several securities publicly listed on the markets. This includes namely stocks. This includes namely all securities publicly listed on the following markets:

NYSE (New York Stock Exchange)

Nasdaq

Amex

Euronext

LSE (London Stock Exchange)

LIFFE

Tokyo Stock Exchange

Hong Kong Stock Exchange.

5—Methods and Processes Enabling a Financial Operator to Use the Preceeding Methods and Processes Exposed in Order to Distribute Financial Products.

In the following part, let us consider a financial offer of a product based on the same characteristics as those already described for the game offer, but where the products are sold to speculators as very high leveraged financial options.

Preceeding methods and processes already exposed can then be read with a financial operator point of view i.e. following terms should be interpreted by a reader:

game organiser can be read as financial operator, bet can be read as option, or dot option, combined bet can be read as multi-assets option.

Options are be subscribed online, exactly the same way bets are taken in previous descriptions.

What is proposed is to sell all options at a unique price, for instance one dollar.

What is also proposed is that the value point system is the same, except that value point can be quoted another way in order to take the options unit price into account.

The following method can be used:

Let $E_t$ be the mathematical expectation of the points to pay for on t,

P be the fixed unit selling price of an option (for instance expressed in dollars), VP be the point value (for instance expressed in dollars), $$P = VP \times E_t$$

$$VP = P \times \frac{1}{E_t}$$

Notes:

In the case of a single dot option, $E_t = E(|X|)$

In the case of a multi-assets option with three referring dot options, $$E_t = E(|X| + |Y| + |Z|)$$

6—Methods and Processes Enabling a Financial Operator to Provide a Multi-Assets Option.

Existing options (or warrants), whatever their directions (long or short, calls or puts) are one asset backed financial securities. The displayed process consists in backing securities to two or several assets. The backing assets may be stocks, bonds, raw materials, currencies or indexes representing groups of stocks, bonds, raw materials, currencies. So the exercise condition of the new security must lie together on two or several assets. The process comprises a method for calculating the price of the new security at start by deriving it from the prices of the backing assets and of their corresponding direct options.

The process is new for it leads to the creation of more complex securities than the existing options (or warrants) as their prices evolve in function of several assets. But these kind of securities are not a juxtaposition of several existing securities. To hold these types of securities is not equivalent to the possession of several separate existing securities. Indeed, if asset A and asset B are different, the value (so the cost) of an option on A and B joined assets is always inferior to the sum of the values of the corresponding options on A and B distinctly considered assets.

We have the relations:

Value of option $(A,B)$<(value of option $A$+Value of option $B$)

Value of option $(A, B, \ldots, N)$<(Value of option $A$+Value of option $B$+ . . . +Value of option $N$)

Indeed, the option on A and B assets can be exercised only if the conditions on assets A and B are both satisfied. Whereas the detention of two similar options separately on asset A and on asset B enables the exercise of option A if the A condition is satisfied, including the case where the B condition is not and enables likewise the exercise of option B if the B condition is satisfied, including the case where condition A is not.

Thus the following table is built according to the different cases with two assets.

| Condition A | Condition B | Option (A, B) | Option A | Option B |
|---|---|---|---|---|
| Satisfied | Satisfied | Exercisable | Exercisable | Exercisable |
| Satisfied | Unsatisfied | Non-exercisable | Exercisable | Non-exercisable |
| Unsatisfied | Satisfied | Non-exercisable | Non-exercisable | Exercisable |
| Unsatisfied | Unsatisfied | Non-exercisable | Non-exercisable | Non-exercisable |

We can see in the table that, as option (A,B) is just satisfied in one case upon four, it is of less value than the addition of option A and option B where at least one condition is satisfied in three cases.

How to accurately evaluate the option (A, B) price at its creation, for instance, by a market-keeper or a bank?

By applying methods of probability analysis, already exposed in the present application in the part devoted to the play to determine the costs on bets upon several assets, we can formulate a method to evaluate option (A,B) considering the values of the corresponding options A and B.

The values of options A and B are supposed to be known. They may be quoted values on financial markets or values resulting from the use of existing options evaluating methods (upon an unique asset), as for instance the Black & Scholes method.

Considering VA the value of asset A and VB the value of asset B.

Considering PA the value of option A and PB the value of option B.

Considering P(A,B) the value of option (A, B) backed to the asset (A+B) whose value is VA+VB.

One call <<Level effect>> of an option the existing ratio between the asset value V and the option price P.

Considering:

$LA=VA/PA$ et $LB=VB/PB$

We have also:

$(A,B)=(VA+VB)/P(A,B)$

The level effect is always higher than 1 at the time of the option creation by the market-keeper or the bank. Indeed, the characteristic interest of this type of security is to enable an investor to take market positions equivalent to an asset detention but with less of capital. Therefore options are created on this side of the exercise strike (value): below for a call, above for a put. Being "Out of Money" at the time of their creation, they have no "Intrinsic Value", only a "Time Value" of opportunity, much lower than that of the underlying asset. So at the creation: P<V.

Considering the inverses 1/L of the Level Effects $1/LA=PA/VA$ $1/LB=PB/VB$ $1/:L(A,B)=P(A,B)/(VA+VB)$ We have the relation:

$P<V$ so $P:/V<1$ thus $1/L<1$

And as the asset value and the option price at its creation are positive number by nature, we have:

$0<1/L<1$

The option price at its creation is the right price for the issuer and the buyer of the option. It can be considered that it is the financial risk measure taken by the issuer, which is proportional to the asset value. Thus: P=k V where k is a risk coefficient. As a matter of fact the inversed Level Effects hierarchy 1/L of options strictly reflects the hierarchy of their chances of being exercised.

We have:

$k=P/V$ thus $k=1/L$ and therefore: $0<k<1$

Therefore we can consider that the k coefficients as a whole form a probability distribution from 0 to 1, where k represents the risk taken by the issuer, ie the probability of the exercise of the option by the buyer.

Considering: Pr(A) the exercise probability of option A, we have:

$Pr(A)=PA/VA$,

Considering:

Pr(B) the exercise probability of option B, we have:

$Pr(B)=PB/VB$,

Considering: Pr(A,B) the exercise probability of option (A,B) we have:

$Pr(A,B)=P(A,B)/(VA+VB)$.

By appliance of probabilities laws we have:
Pr(A,B)=Pr(A inter B) or probability that both option A and option B may be exercisable.

The probability of A inter B is equal to the probability of A multiplied by the conditional probability of B by reference to A.

And in the case where these events are independent, the conditional probability of B by reference to A is equal to the simple probability of B.

Thus:

$Pr(A \text{ inter } B)=Pr(A) \times Pr(B)$ $Pr(A,B)=k(A,B)=P(A,B)/V(A,B)=P(A,B)/(VA+VB)$ So:

$$P(A,B)=Pr(A,B)\times(VA+VB)$$

$$P(A,B)=Pr(A \text{ inter } B)\times(VA+VB)$$

And if A and B are independent events:

$$P(A,B)=Pr(A)\times Pr(B)\times(VA+VB)$$

$$P(A,B)=(PA/VA)\times(PB/VB)\times(VA+VB)$$

$$P(A,B)=PA\times PB\times(VA+VB)/(VA\times VB)$$

Thus, if the current prices of two assets A and B can be considered as evolving in an independent way, then the issue price of the multi-assets option (A,B) must be equal to the product of the prices of option A and option B, multiplied by the sum of the values of asset A and asset B and divided by the product of the values of asset A and asset B.

In case of an option backed to more than two assets two by two independent, we get in the same way by applying probability laws:

$$P(A, B, \ldots N)=Pr(A \text{ inter } B \text{ inter } \ldots N)\times(VA+VB+\ldots N)$$

$$Pr(A \text{ inter } B \text{ inter } \ldots N)=Pr(A)\times Pr(B)\times Pr(C)\times \ldots Pr(N)$$

$$P(A, B, \ldots N)=(P(A)/VA)\times(P(B)/VB)\times \ldots (P(N)/VN)\times(VA+VB+\ldots VN)$$

$$P(A, B, \ldots N)=PA\times PB\times \ldots PN\times(VA+VB+\ldots VN)/(VA\times VB\times \ldots VN)$$

To check that the assets evolve two by two in independent ways, one can use statistical methods of correlation analysis among historical values series, for instance the regression method.

When the assets are strongly correlated, the multi-assets option has a minor economic interest as then the price of the multi-assets option cannot be significantly lower than that of the option backed on an unique asset. The previously exposed formula can be applied only to the pricing at their creation of options, the assets of which can be considered as statistically independent two by two.

EXAMPLES

1. Example of a Multi-Assets Option on Stock and Currency

A foreign investor, holding stocks from an US company quoted on an US stock-exchange, ought to cover his investment against both an unfavourable movement of his dollar quoted stocks and an unfavourable movement of the dollar rate of exchange versus his own currency. These separated covers on stock and currency are today too expensive to be economically applied. But if in a recent period the correlation analysis shows that the evolutions of the stock quotes and that of the currency rates of exchange are statistically independent, then the investor may find advantage to buy a put of a multi-assets option, backed both on the stock and the currency, the cost of which is minor compared to the two separate covers.

2. Example of a Multi-Assets Option on Treasury Notes and on Currency

Let us suppose that on a recent period the correlation analysis shows a negative correlation between the Treasury Notes quotes and those of the dollar versus an other currency. A foreign investor in Treasury Notes may consider that the two reverse movements are almost balanced. But he may want to cover his asset against a defavourable evolution in the same time of both the Notes quotes and the currency quotes. Then the investor may find advantage to buy a put of a multi-assets option, backed both on Treasury Notes and the currency, the cost of which is minor compared to the two separate covers.

3. Example of a Multi-Assets Option on Different Stocks

A domestic investor holds A stocks which are performing and correlated last months to the stock-exchange. This investor makes a short selling of B stocks badly performing and non-correlated with the market, so non-correlated with A stocks. To cover his whole position, the investor may buy at an advantageous price a multi-assets option backed both on A and B stocks and consisting of a put on A and a call on B.

Scoring

The invention comprises a scoring method for forecasting games and betting. Specifically, it comprises a scoring method for a financial forecasting game.

General Aspects and Remarks

Generally, the method includes calculating a score to evaluate the quality of one or several forecasts or bets. More specifically, the scoring is oriented towards a measure of the accuracy level of forecasts or bets. It is not limited to the traditional determination of a winner. Namely, it is not a competition. For one or several events, depending on situations, actual outcomes are mathematically compared to anticipations in order to calculate a score. This score is then compared with a value, called tolerance, to determine is the forecast or forecasts are winning.

First and explicitly, it is not a competition. In a competition, players are ranked according to a criteria, and the determination of one of several winners is made based on this rank. In a competition, a comparison between players is necessary to determine winners.

In the present invention, the determination of winners is based on a comparison between the score of an individual player and a tolerance. The score of other players does not impact the fact that an individual player is or is not a winner.

This main difference between the invention and a competition has namely the following consequences. Whereas a competition needs several players, a game based on the present scoring method can also be organised with one player only. Whereas a competition has necessarily at least a winner, it is possible for a game based on the present scoring method to have no winner. Whereas the number of winners is necessarily predefined in a competition, the number of winners is not necessarily predefined in a game based on the present scoring method.

Second, and explicitly, it is not a parlay-type method. In parlays, a player can combine two or more bets into one bet. Each bet within the parlay must win for the parlay to win. For a forecasting game, it means a player can express a set including different forecasts. Forecasts are then determined individually as acceptable or not acceptable by a comparison between each forecast and its corresponding event outcome. The number of acceptable forecasts in a given set of forecasts is the criteria used to determine if the player having played the set of the forecasts is a winner.

In the present invention, the determination of winners is based on a comparison of the score calculated for the set and a tolerance. The score is globally calculated for the set, with no specific assessment of each of the forecasts included in the set.

This main difference between the invention and a parlay has consequences. Whereas a parlay has to have all of its individual forecasts acceptable to be winning, this is not a necessity for a game based on the present scoring method because forecasts are not considered individually. What's more, individual bets of a parlay usually consist in determining who is the winning team, whereas the global score of the present invention measures the distance between forecasted outcomes and actual outcomes, cumulatively for all forecasts included in the group of forecasts. You have namely cases where a player can express forecasts which are very close to actual outcomes but do not correspond to a correct prediction of winning teams.

Third, the present invention described for forecasting games in general and betting games in general is a direct adaptation of methods already disclosed for a financial forecasting game in U.S. Ser. No. 12/003,394, filed on Dec. 26, 2007 which is related to and claims the benefit of U.S. Provisional Application 60/877,101, filed Dec. 26, 2006, and all of which are incorporated in their entirety herein by reference.

This disclosure namely exposes a method and processes for a financial forecasting game where one player has to make a combined bet including several forecasts, where the forecasts are relative to actual outcomes, where a tolerance is used for the determination of winning bets, and where a process is described for measuring the quality of a bet combining several forecasts, which consists in cumulating, for all the forecasts included in the bet and in absolute value, the difference between the forecasts and the actual values.

Financial Forecasting Game

Disclosure has already been made in U.S. Ser. No. 12/003, 394, filed on Dec. 26, 2007 which is related to and claims the benefit of U.S. Provisional Application 60/877,101, filed Dec. 26, 2006, and all of which are incorporated in their entirety herein by reference.

Namely, processes of scoring, rating and ranking are described under title 2.F—Methods and processes enabling the game organiser to measure game performances of each player, corresponding to brackets 00072 to 00079 of in U.S. Ser. No. 12/003,394, filed on Dec. 26, 2007.

Business Model

The game or its embodiments can be associated with a variety of business models depending on who is paying. For example, the game model could be a paid-for game model, an advertising model, a direct marketing model, an e-commerce model, a promotional model, a financial model, a model in relation with social networks, a model in relation with mobile devices, a model in relation with television or any other model. The game could also be a model combining two or any number of precited models together or in combination with any other additional model.

For instance, the game could be proposed at reduced cost to players and get revenues from advertisers. A possibility could be to propose the game for free to players. Advertisers could pay for advertising banners or advertising displays of any type that players could see while they play. Players could see messages, texts, photos videos paid by advertisers. An embodiment of the game could be a website that offers the game to the public with advertising. Another embodiment of the game could be a game offered on a mobile device with advertising, or on television with advertising.

The game can have a direct marketing model. The registrations to the game can be a source of data that could be sold and make revenues for the game. For instance, email addresses of players, or their names, or their physical addresses could be sold to companies who are interested in such information. Additionally, the registration process is an opportunity to gather additional information that could interest companies. Namely, informations related to financial issues could be of interest: if the player already has a stockbroker, a retirement plan, is interested in forex trading, stock trading options trading or any other type of information. But many other type of information could also be interesting, and specifically defined in accordance with a client company. The company could be interested in changing the registration process in order to have its particular questions added to a standard registration process. The company could pay for the campaign as a global service, for a quantity of data, other specific fees, or a combination thereof. Particular questions can be, but do not necessarily have to be related to finance. Companies selling, for example cars could find interesting to add questions in the registration process concerning intentions to buy a car expressed by players when asked during the registration process. One understand that such a possibility can concern any type of company, in any field of activity. Another option could also be that a company pays to change the validation process in order to have its particular questions added to the validation of the game. The interest of that formula may be to gather information with players and not only with registrants. As a player can play several times after one registration, the basis for information gathering could be broader. In a direct marketing model, clients could be companies, but also direct marketing firms that may buy services or want to establish partnerships. A possibility is also to sell emailing campaigns, based on the total database, or on any part of it refined according any available criteria.

Pool Betting

The game or the described embodiments can be associated with a pay-out process similar to pool betting to determine the awards. In an embodiment, a winner is determined by a comparison between the score of his bet—or combined bet or set of forecasts—and the tolerance. For a game session including several players, winners are then known at the end of the game sessions. A global amount can then be divided between the determined number of winners to know the amount of individual awards.

The global amount can also take into account the score of winners to reward them according to their performance. Instead of having equal awards between winners, awards values will then be different between winners. This can be done by defining categories of winners, each category being associated with a particular prize value. This can also be done by individually correlating the award value with an individual performance measure. Namely, the global amount can also take into account the score of winners to reward them according to their performance.

The global amount can come from players, for example, if players pay for a ticket, or in any form, for a right to play. It can come from players who pay wagers for betting. It can come from players who pay the game organiser for services associated with the game. In an embodiment, players pay to play and generate a revenue. The global amount is taken from this revenue, and divided among the determined winners.

If there are no winners in a game sessions, the would be global amount of this session can either be a gain for the game organiser. It can also be carried over to the next session, or to a jackpot session, or any other formula.

Financial Forecasting Game—Explicitations

The invention can be used in a financial forecasting game where a player has to make at least one forecast on at least one quote. A score is calculated to measure the quality of the forecast(s). The score is then compared with a tolerance. The determination that the player wins an award is based on this comparison of the score with the tolerance.

The game can be played with one player only. It can also be played with several players. The game can consist in forecasting one quote only. It can also consist in forecasting a plurality of quotes.

For example, an embodiment can be a game that consists in forecasting the value of one quote. A score is then calculated to give a measure of the distance between the forecast and the value of the quote. The lower the score is, the better is the quality of the forecast. A score of zero means an exact forecast. When compared with the tolerance, the score can be less than, equal to, or more than the tolerance. In one embodiment, the player is winning when his score is less than or equal to the tolerance. In one embodiment, the player is winning when his score is less than the tolerance.

The score can be calculated as the absolute value of the difference between the forecast and the actual value of the quote. The score can also be calculated as the absolute value of the difference between the forecast and the actual value of the quote, the whole divided by the actual value of the quote. The score can also be calculated as a weighted average of the absolute value of the difference between the forecast and the actual value of the quote.

The score can be calculated with any mathematical formula based on the difference between the forecast and the actual value of the quote. Namely, formulas can use inverse values. For example, the score can be calculated as one divided by the difference between the forecasts and the actual value, or the absolute value of this number. It can be calculated as the actual value of the quote divided by of the difference between the forecast and the actual value of the quote. It can be calculated as a weighted average of the absolute value of one divided by the difference between the forecast and the actual value of the quote. In the described formulas using inverses, the higher the score is, the better is the quality of the forecast.

The formulas using inverses may also be used for calculating the value of awards.

An embodiment can be a game where a player has to forecast a market index, for example the Dow Jones. An embodiment can be a game where a player has to forecast a currency, for example the euro/dollar rate. An embodiment can be a game where a player has to forecast an equity, for example Google. Embodiments are possible with any listed value or any traded value. Namely, they can include values based on market indexes, currencies or equities, but also on bonds, treasury rates, credit rates, and any values from the markets or from economic public data, such as, for example, unemployment rate, economic growth, or inflation.

In another example, an embodiment is a game that consists in forecasting the value of a plurality of quotes. A score is then calculated to give a measure of the distance between the forecast and the value of the quote. The lower the score is, the better is the quality of the forecast. A score of zero means a set of exact forecasts. When compared with the tolerance, the score can be less than, equal to, or more than the tolerance. In one embodiment, the player is winning when his score is less than or equal to the tolerance. In one embodiment, the player is winning when his score is less than the tolerance.

The score can be calculated by cumulating, for all the forecasts and in absolute values, the differences between each forecast and the corresponding actual value of the quote. The score can also be calculated by cumulating, for all the forecasts and in absolute values, the differences between each forecast and the corresponding actual value of the quote the whole divided by the actual value of the quote. The score can also be calculated as a weighted average, for all the forecasts, of the absolute values of the differences between each forecast and the corresponding actual value of the quote.

The score can be calculated with any mathematical formula based on the differences between the forecasts and the corresponding actual values of the quotes. Namely, formulas can use inverse values. For example, the score can be calculated by cumulating, for all the forecasts and in absolute values, one divided by the differences between each forecast and the corresponding actual value of the quote. The score can also be calculated by cumulating, for all the forecasts and in absolute values, the actual value of the quote divided by the differences between each forecast and the corresponding actual value of the quote. The score can also be calculated as a weighted average, for all the forecasts, of the absolute values of the inverses of the differences between each forecast and the corresponding actual value of the quote.

The formulas using inverses may also be used for calculating the value of awards.

An embodiment can be a game where a player has to forecast a plurality of market indexes, for example the Dow Jones, the Nasdaq and the CAC. An embodiment can be a game where a player has to forecast a plurality of currencies, for example the euro/dollar rate and the euro/yen rate. An embodiment can be a game where a player has to forecast a plurality of equities, for example Google, Apple and Microsoft. Embodiments are possible with any listed value or any traded value. Namely, they can include values based on market indexes, currencies or equities, but also on bonds, treasury rates, credit rates, and any values from the markets or from economic public data, such as, for example, unemployment rate, economic growth, or inflation.

A player can forecast a plurality of forecasts that include the same type of quotes. This is the case when a player can forecast several market indexes, or several currencies, or several equities, or several of any other listed or traded values, or several forecasts referring to a same type of quote or data. Namely, they can include sets of forecasts forecasting values based on only market indexes, only currencies or only equities, but also only bonds, only treasury rates, only credit rates, and only values from the markets or from economic public data, such as, for example, unemployment rate, economic growth, or inflation.

A player can also forecast a plurality of forecasts that include different types of quotes. Namely, this is the case when a player makes sets of forecasts referring to quotes or data belonging to different categories. For example, a plurality of forecast can include one market index and one currency.

The score can be calculated using cumulation of differences based on actual values of the quotes. But the score can also be calculated cumulation of differences based on percentages of actual values of the quotes. It can be calculated using a weighted average of values based on actual values of the quotes.

When a player forecasts a plurality of forecasts referring to quotes of different categories, a way of calculating the score can preferably be a cumulation of percentages or a weighted average. This is a solution to have a better measure, whatever the value of the forecasted number.

For example, an embodiment consists in forecasting the dow jones and the nasdaq at a designated time. If the forecasts of the player are 11542 for the dow jones, and 2533 for the nasdaq and the actual values are 11547 for the dow jones, and 2523 for the nasdaq, a first technique for the calculation of the score can be: taking 11542 minus 11547, in absolute value, which equals 5, and then taking 2523 minus 2533, in absolute value, which equals 10, and then cumulating 5 and 10 which equals 15. With this calculation technique, the score is equal to 15. Another technique for the calculation of the score can be: taking 11542 minus 11547, in absolute value, which equals 5, and then dividing 5 by 11547 which equals 0.0004330129, and then taking 2523 minus 2533, in absolute value, which equals 10, and then dividing 10 by 2523 which equals to 0.0039635354, and then cumulating 0.0004330129 and 0.0039635354 which equals 0.0043965483. With this calculation technique, the score is equal to 0.0043965483. Another technique for the calculation of the score can be: taking 11542 minus 11547, in absolute value, which equals 5, and then taking 2523 minus 2533, in absolute value, which equals 10, and then weighting 5 by a factor which can be calculated as 2523/(2523+11547) which equals 5 multiplied by 2523/14070 which equals to 0.896588486, and then weighting 10 by a factor which can be calculated as 11547/(2523+11547) which equals 10 multiplied by 11547/14070 which equals 8.2068230277, and the cumulating 0.896588486 and 8.2068230277 which equals to 9.10341151137.

More generally, weighted averages can be calculated with different types of weighting. One possibility is described above in a specific example and consist in using weights that reflect values of actual quotes included in a plurality of forecasts. Another technique can consist in using weights that rather reflect volatilities of actual quotes included in the plurality of forecasts. In that case, spread calculations used for probability measures and values of prizes as described in U.S. Ser. No. 12/003,394 may be used as a basis for weighting. Another technique can also consist in using weights arbitrarily chosen by the game organiser.

Awards for winners can be equal for all winners. In that case, any winner has a prize having the same value. This value can be a total prize amount divided by the number of winners. The total prize amount can be defined as above in the pool betting section. The total prize amount can also be defined using techniques described in U.S. Ser. No. 12/003,394 and that base prizes values on differences in actual quotes. A prize can be predefined for any winner. A technique to predefine a prize can be to predefine the amount value. Another technique can be to predefine a calculation method for the amount value.

Awards for winners can be different between winners. In that case, winners receive prizes having different values. For example, prizes can be different to reflect the performance of players. In one embodiment, scores are used as a basis to size the value of prizes. In another embodiment, rankings are done between winners. Winners may be ranked according to any criteria. Then the values of prizes may differ, based on the ranking of the winners. In one embodiment, the winners may be ranked based on the time their forecasts were done. In one embodiment, the winners may be ranked according to their score.

Designated times of forecasts can be different according to embodiments. For example, in an embodiment a game can consist to forecast closing values of quotes. Another embodiment can consist in making forecasts on any given time, and not only closings. In that case, the given time can be for tomorrow, for the next hour, for the next seconds. For example, a player can validate a forecast which will be compared with an actual value of quote in the next 10 seconds, or in the next any given period of time.

An embodiment is a game where a player can make one forecast associated with a quote at a designated time. An embodiment is a game where a player can make several forecasts associated with several corresponding quotes at a same designated time. An embodiment is a game where a player can make several forecasts associated with several corresponding quotes at different designated times. An embodiment is a game where a player can make several forecasts associated with one quote, but at different designated times. An embodiment is a game where a player can make a first forecast on one quote for a first designated time, and when the actual value of the quote is known, make a second forecast of the quote for a second designated time.

An embodiment is a casino game where a player can forecast one value of quote and win depending on his score. Another embodiment is a casino game where a player can forecast a plurality of values of quotes and win depending on his score. An embodiment is an online game where a player can forecast one value of quote and win depending on his score. Another embodiment is an online game where a player can forecast a plurality of values of quotes and win depending on his score.

All these embodiments can namely be casino games, or online games. They also can be free games or paid-for games. They also can be proposed as free games, but with chargeable associated services. In casino games, namely, players may be asked to pay to play. In online games, players may be proposed to play for free. They may also be proposed to be charged for optional services.

An example of embodiment is a game where a player has to forecast what a quote value will be in the next ten seconds, or any other short designated period of time. His score is calculated and compared to a tolerance. The player is then declared winner or loser based on this comparison betseen his score and the tolerance.

An example of embodiment is a game where a player has to forecast what several quote values will be in the next ten seconds, or any other short designated period of time. His score is calculated and compared to a tolerance. The player is then declared winner or loser based on this comparison betseen his score and the tolerance.

An example of embodiment is a game where a player has to forecast what a quote value will be in the next ten seconds, or any other short designated period of time. He can play as long as he wants. His unique score is calculated and compared to a tolerance. The player is then declared winner or loser based on this comparison betseen his score and the tolerance.

An example of embodiment is a game where a player has to forecast what several quote values will be in the next ten seconds, or any other short designated period of time. He can play as long as he wants. His unique score is calculated and compared to a tolerance. The player is then declared winner or loser based on this comparison betseen his score and the tolerance.

An example of embodiment is a game where a player can forecast what one or several quote values will be in the next ten seconds, or any other short designated period of time. He can play as long as he wants. He can choose quotes as he wants. He can sometimes forecast one quote, sometimes forecast another quote, sometimes forecast a plurality of quotes, sometimes a same or a different plurality of quotes: he has a total freedom in his choices. His unique score is calculated and compared to a tolerance. The player is then declared winner or loser based on this comparison between his score and the tolerance.

An example of embodiment is a game where a player uses adapted interfaces. The game operator proposed easy to use ways of playing. For example, instead of having to give numbers, the player can touch a point on a graph presented on a screen. Another example is an embodiment where the player speaks to a voice recognition system. Another example is a game where the player can be proposed one or several numbers. These can be proposed at random or based on information given by the player. An example is a game where the player is proposed several strategies or options with buttons to click corresponding to each strategy or option.

An embodiment is a game where the value of the award, if won, is based on a difference between a first actual quote value at a first designated time and a second actual quote value at a previous designated time. The game may be any game and in any field. For example, an embodiment is a financial quiz where the award is based on actual quote values differences. For example, an embodiment is a daily financial quiz where you can win an amount based on the variation of a market index, like, for example, the dow jones. For example, an embodiment is a daily financial quiz with questions on a specific company, group associated to a quote and where the award is based on the difference of actual values of that quote. Such a game can be sponsored by the company or group associated with the quote.

An embodiment is a game where players are asked to make forecasts, and where the prize value they win is given in cash. This applies to all embodiments described in the application, whether forecasts are associated with quotes, or outcomes of any other type of event.

Another embodiment is a financial forecasting game where players can win prizes which values are calculated based on differences in actual values of quotes. For example, an embodiment is a game where a player can forecast one or several quotes, and win the calculated value in product and not in cash. For example, a player can forecast the markets and win oil. For example, a player can win a car. For example, a player can win coupons.

The examples described in the previous paragraphs may consist in embodiments for a casino. They may also consist in embodiments for an online game.

In one embodiment, a tolerance is associated with the set of forecasts. For a set including several forecasts, the process consists in cumulating, for all the forecasts included in the set and in absolute value, the difference between the forecasts and the effective quote levels. This cumulation is a score that measures the quality of the set: the closer this number stands to zero, the better the forecast is. The score is then compared with the tolerance to determine if the set is winning. The score has to be less than or equal to the tolerance for the set to win.

The score can be calculated by cumulating, for all the forecasts included in the set and in absolute value, the difference between the forecasts and the effective quote levels. It can take into account the relative weight of the different components included in one set. Namely, the score can be calculated as above by cumulating, for all the forecasts included in the set and in absolute value, the difference between each forecast and the associated actual quote level the whole divided by the associated actual quote level. For the same purpose, the score can also be calculated as above by calculating a weighted average, for all the forecasts included in the set and in absolute value, of the difference between each forecast and the associated actual quote level.

All what is herein disclosed for a financial forecasting game is explicitly also disclosed for an embodiment as a financial instrument. The reader is asked to consider the game as a financial option, or as something similar as or close to a financial option. Namely, the condition of winning for the game must be read as the condition of exercise for the option. Namely, the prize value must be read as the value of the option.

All games, financial instruments, methods and embodiments described in this application, as well as all games, financial instruments, and methods described in application U.S. Ser. No. 12/003,394 can explicitly have hybrid embodiments. An embodiment is a game including forecasts expressed by one player combined with forecasts expressed by another player. The embodiment can be associated with any type of combination or any way of combining. The embodiment can be associated with a score calculated based on forecasts received from different players. The embodiment is described as or associated with a financial forecasting game. The embodiment is described as or associated with other types of games, including games which are not financial. An embodiment is a financial instrument where conditions of exercise are based on information received from different buyers. An embodiment is a financial instrument where conditions of exercise are based on a combination of information received from different buyers. The embodiment can be associated with any type of combination or any way of combining. The embodiment can be associated with a score calculated based on information received from different buyers. The embodiment is described as or associated with financial instruments based on quotes. The embodiment is described as or associated with and for financial instruments based on other types of actual outcome, including actual outcome of games. Namely, games can include online games, casino games, video games, sports games, poker games. In one embodiment, called hybrid option, a condition of exercise is fulfilled when a first condition of exercise based on information received from a first buyer and a second condition of exercise received from a second buyer are fulfilled. In one embodiment, a condition is fulfilled when a score is less than or equal to a tolerance, the score being calculated based on information received from the first buyer and information received from the second buyer.

Forecasting and Betting Games

An embodiment of the invention can easily be adapted for all games where forecasts are possible.

The process of game is similar to the process described for the financial forecasting game. Namely, the reader is asked to read the previous description with replacing the process of forecasting financial quote(s) with the process of forecasting any type of game actual outcome. In particular, forecasts concern actual outcomes and have to be compared to actual outcomes when theses actual outcomes are known. This comparison is made by establishing a score calculated as a difference between the value of the forecast and the value of the corresponding actual outcome. This comparison can be put in absolute values. When several components are considered, the score is established as a cumulation. When the forecasts concern several events, each event is considered as a component. When the outcomes comprise several values, each value is considered as a component.

The score can be calculated as above by cumulating, for all the forecasts included in the set and in absolute value, the difference between the forecasts and the corresponding actual outcomes. It can also be calculated to take into account the relative weight of the different components included in one set. Namely, the score can be calculated as above by cumulating, for all the forecasts included in the set and in absolute value, the difference between each forecast and the associated actual outcome the whole divided by the associated actual outcome. With the same purpose, the score can also be calculated as above by calculating a weighted average, for all the forecasts included in the set and in absolute value, of the difference between each forecast and the associated actual outcome.

An embodiment of the game is a game which is not a competition between players. A tolerance is announced, and a player has to have a score less than or equal to the tolerance for his forecasts to be considered acceptable. The criteria of acceptability is not a the rank of a player compared other players but a comparison between the player's score and a specific level required by the game organiser.

Embodiments of the invention may include a set of forecasts associated with different events at the same time or different events at different times. Embodiments may include a set of forecasts associated with a same event at different times.

Embodiments may include a set of forecasts associated with the same type of event. For example, a game can consider a set of forecast associated with a series of soccer matches, or basketball matches, or baseball matches, or hockey matches, or football matches for example. Embodiments may include a set of forecast associated with different types of events. For example, a game can consider a set of forecasts associated with a series mixing events of different sports.

Embodiments may include a set of forecasts associated with events belonging to different categories. An embodiment may for example include a set of forecasts mixing sportive and non sportive events, or mixing financial and non financial events. It may for example include mixed financial and sport forecasts.

Depending on the composition of a set of forecasts, the score can be calculated by cumulating for all forecasts of the set, and in absolute values (i) the value of each forecast minus the corresponding actual outcome, or (ii) the value of each forecast minus the corresponding outcome, the whole divided by the corresponding outcome. It the score can also be calculated as a weighted average of (i) the value of each forecast minus the corresponding actual outcome, or (ii) the value of each forecast minus the corresponding outcome, the whole divided by the corresponding outcome.

A set composed of forecasts of different types, or of forecasts belonging to different categories may find preferable to calculate a score that uses weighted averages or calculations using percentages. It is namely the case for scores calculated based on values of forecasts minus corresponding outcomes, the whole divided by corresponding outcomes.

Scores calculated based on the weighted average process may additionally take into account other elements in the weight. Namely, an embodiment is when the game weights differently accordingly to a correct or incorrect winner prediction. For example, in a basketball match where the outcome is 82-87, and with a method that cumulates absolute values of differences: a first set with 86-83 would score abs(86-82)+abs(83-87) equals 8, and a second set with 78-91 with the same method, would score abs(82-78)+abs(87-91) equals 8. The two sets would score the same, with one set having correctly predicted the winner but not the second. An embodiment of a game including weighted averages could refine the method and lead to different results. For example, weighting 1 a correct prediction winner and weighting 2 and incorrect prediction winner would score the following: the first set with 86-83 would score abs(86-82)+abs(83-87) equals 8, and a second set with 78-91 with the same method, would score 2×(abs(82-78)+abs(87-91)) equals 16.

Taking into account single components in score calculation is made by cumulation of single differences, or single percentages, or calculating a weighted average.

For an first event associated with one forecast only—for example the value of a quote value, or of any number, like a television or radio audience number, or economic indicators, like inflation rate or GDP growth, or a score in golf—a single component is calculated based on the forecast and the corresponding actual value. For example, in a TV audience forecast of 123 000 for an actual of 123 456, the single component can be scored 456. It can also be scored 456 divided by 123 456 equals 0.003694.

For a second event associated with two forecasts, for example the outcome of a match including two values—one value for the team A and one value for the team B, we may consider that the event has two components. The score may by cumulation across the two components. For example, in a basketball match where the outcome is 82-87, two forecasts being 86-83 would score abs(86-82)+abs(83-87) equals 8. It could also be scored 8 divided by 82+87 equals 0.047337.

The same logic may be applied to a third event associated with more than two forecasts, for example the outcome of a tennis match. For an outcome of 6-2, 6-3, 4-6, 7-6, and a set of including the following forecasts: 6-3, 2-6, 6-3, 7-6, a score could be established by cumulating absolute values of differences abs (6 minus 6)+abs (2 minus 3)+abs (6 minus 2)+abs (3 minus 6)+abs (4 minus 6)+abs (6 minus 3)+abs (7 minus 7)+abs (6 minus 6)equals 0+1+4+3+2+3+0+0=13. It could also be scored 13 divided by 6+2+6+3+4+6+7+6 equals 13 divided by 40 equals 0.325.

Different illustrative examples can be given of applications of the scoring method to forecasting games.

Forecasts can be associated with an outcome of sporting events, for example. Namely, it can be football, soccer, rugby, basketball, hockey, baseball, tennis, waterpolo or golf. It can be associated with races of any type, like horse races, dog races or car races or boat races. It can be associated with well-known sportive events, like events of the olympic games. It may be athletics of any type, any namely human races, throwings, ski races.

Forecasts can be associated with entertainment of any type. For example forecasting the weather, the audience of TV shows, the box office score of movies, the success scores of music or songs, what will happen in live TV shows, and namely what will happen in reality shows, who will win a competition, and namely a poker competition, or a competition to sing, or a competition in a TV game, or any other competition associated with public entertainment. For example, players can be asked to give forecasts associated with poker. In this embodiment, players make forecasts relative to a poker tournament to forecast winners or scores of winners. In another embodiment, players can make forecasts relative to single poker play, or associated with a single poker hand.

Specific embodiments of the game are associated with online games. In online games, players are asked to accomplish one task or several tasks successfully to win. Before they start the game play, they are asked to make forecasts relative to their game play. For example, they can forecast the time they will spend to accomplish part(s) of the game, the number of trials they will have to do before they succeed, the score, and any other quantifiable data relative to the game play. This data is then used in the scoring method. In an embodiment, the player can play alone, and forecast or bet on his own performances. For example, this is the case of a player playing a game of golf and who is asked, for example, to forecast his score. In an embodiment, a player can play with (or against) one or several other players and can forecast or bet on his performance, relative performance or rank. For example, this is the case of a player racing against others in an online game. The player can be asked, in one embodiment, to forecast his racing time and others racing time. In the described examples, the forecasts are then used in the scoring method. In an embodiment, watchers can forecast the outcome of other players without being directly part in the play themselves. For example, a gamer can log in on a gaming platform, and see what others are doing. He can then make forecast on their performances. In an embodiment, the score from the scoring method is taken by players as a basis for bets between them. In this embodiment, the player that makes a forecast my bet with one or with a group of players that he, or someone will be able to do a particular performance, this particular performance being measured with the scoring method.

Specific embodiments of the game are associated with video games. The description hereabove, for online games, is the same for video games. There are even more possibilities of forecasting as video games offer an enriched gaming environment. In video games, players are may be asked to accomplish one task or several tasks successfully to win. Before they start the game play, they are asked to make forecasts relative to their game play. For example, they can forecast the time they will spend to accomplish part(s) of the game, the number of trials they will have to do before they succeed, the score, and any other quantifiable data relative to the game play. This data is then used in the scoring method. In an embodiment, the player can play alone, and forecast or bet on his own performances. For example, this is the case of a player having a mission to accomplish in a video game and who is asked, for example, to forecast his score.

In an embodiment, a player can play with (or against) one or several other players and can forecast or bet on his performance, relative performance or rank. For example, this is the case of a player racing against others in an online game. The player can be asked, in one embodiment, to forecast his racing time and others racing time. In the described examples, the forecasts are then used in the scoring method.

Financial Instruments

Embodiments of the invention can be described as financial instruments. Namely, disclosure has been done in U.S. Ser. No. 12/003,394 for a dot-option.

Embodiments described in this application can all be understood as financial instruments. The reader is asked to replace the game operator by the financial operator. The reader is asked to replace the game by the financial instrument. The reader is asked to replace the condition of winning by the condition of exercise. The reader is asked to replace the prize value by the value of the financial instrument. Namely, the financial instrument is a option-type financial contract between a buyer and a seller.

Explicitly, the embodiment can be a financial instrument wherein the buyer is asked to define himself the strike price. The buyer can be asked to send the strike price to the seller, in order to define the contract. The buyer can be asked to use user-friendly interfaces, such as graphs to touch or click on or any other display that enable the player to define a number indirectly, this number being received by the seller and used as the strike price to define the option contract. What is here described is an interactive option, in which the option contract is defined based on a strike price which is defined by the buyer. We are not in the traditional case of a product defined by a seller, and then proposed to a buyer. We are explicitly in the case of a financial product which is based, for his definition, on a strike price defined by the buyer. Namely, the buyer can use remote communications systems to send the information needed to define the option contract.

An embodiment of the invention is a financial instrument where the buyer has to define a value of a strike price. This value is associated with an underlying asset and a designated time. In one embodiment, the condition of exercise is associated with a comparison between the actual value and the strike price. A tolerance can be added or subtracted from the strike price, defining two values. The actual value has to fall within the two values for the option to be exercisable. In calculations, values can include decimal parts, exclude decimal parts, be integers, rounded values.

In an embodiment, the condition of exercise is associated with a value of the score. The score is calculated the same way is disclosed for games in this application. Namely, the score can be a difference between the strike price and the actual value of the quote. The score can be based on weighted average of a difference between the strike price and the actual value of the quote. The score can include percentages-type calculations of a difference between the strike price and the actual value of the quote. The score can be calculated as the division of the difference between the strike price and the actual value of the quote by the actual value of the quote. The score has to be less than the tolerance, or less than or equal to the tolerance for the option to be exercisable.

In an embodiment, the value of the financial product is based on the difference between the actual value of the quote at a designated time and the actual value of the quote at a designated previous time.

In an embodiment, the value of the option, when exercisable, is defined as based on the difference between the actual value of the quote at a designated time and the actual value of the quote at a designated previous time.

A financial instrument based on several underlyings are considered in a similar way.

Embodiments are similar to described embodiments with one quote, except that the buyer is asked to send several values, or express several values, each being associated with an underlying quote and a designated time.

Explicitly, the embodiment can be a financial instrument wherein the buyer is asked to define himself a plurality of strike prices. Each strike price is associated with a quote and a designated time. The buyer can be asked to send the strike prices to the seller, in order to define the contract. The buyer can be asked to use user-friendly interfaces, such as graphs to touch or click on or any other display that enable the player to define a plurality of numbers indirectly, the numbers being received by the seller and used as the strike prices to define the option contract. What is here described is an interactive option, in which the option contract is defined based on strike prices which are defined by the buyer. We are not in the traditional case of a product defined by a seller, and then proposed to a buyer. We are explicitly in the case of a financial product which is based, for his definition, on strike prices defined by the buyer. Namely, the buyer can use remote communications systems to send the information needed to define the option contract.

An embodiment of the invention is a financial instrument where the buyer has to define values of strike prices. These values are associated with underlying assets and designated times. In one embodiment, the condition of exercise is associated with a comparison between actual values and strike prices. Tolerances can be added or subtracted from the strike prices, defining two values associated with each quote. The actual values have to fall within the two values to be acceptable. The actual values have to fall within the two values, all or in part, for the option to be exercisable. An embodiment is a financial instrument, or an option, wherein all actual values have to be acceptable for the option or contract to be exercisable. An embodiment is a financial instrument or an option wherein the option or contract is exercisable when some of the actual values have to be acceptable. In calculations, values can include decimal parts, exclude decimal parts, be integers, rounded values.

In an embodiment, the condition of exercise is associated with a value of the score. The score is calculated the same way is disclosed for games in this application. Namely, the score can be a cumulation of differences between the strike prices and the actual values of quotes. The score can be a cumulation of weighted averages of differences between the strike prices and the actual values of quotes. The score can be a cumulation including percentages-type calculations applied to of differences between the strike prices and the actual values of quotes. The score can be a cumulation of divisions of the differences between the strike prices and the actual values of the quotes by the actual values of the quotes. The score has to be less than the tolerance, or less than or equal to the tolerance for the option to be exercisable.

In an embodiment, the value of the financial product is based on the differences between the actual values of the quotes at designated times and the actual values of the quotes at designated previous times. In an embodiment, the value of the option, when exercisable, is defined as based on the difference between the actual values of the quotes at designated times and the actual value of the quote at designated previous times.

In one embodiment, the financial instruments or options are sold at fixed price. In one embodiment this fixed price is a unique price, no matter what the underlying is. The contract value, when exercisable, is based on one or several multipliers, and on the differences between actual quote values and strike prices received from the buyer. In the traditional way of calculating, the option is first defined, then priced, then sold. Introductory prices depend on products, and do not have the same introductory value. In one embodiment, the option is defined to be sold at a unique price, for example one dollar, or ten dollars, or hundred dollars. Taking this predefined introductory price into account and the information received from the buyer, the multiplier is defined, or the multipliers are defined.

For example, the financial operator does not define, first, a multiplier and, second, the value of the introductory price of the financial instrument or option based, in part, on the multiplier. The financial operator defines, first, the value of the introductory price and, second, the value of the multiplier based, in part, on the determined introductory price.

In an embodiment, a financial instrument or option can be a hybrid product, wherein associated conditions of exercise involve more than one buyer.

In an embodiment, a financial instrument or option is associated with one underlying. In an embodiment, a financial instrument or option is associated with more than one underlying. In an embodiment, a financial instrument or option is associated with one designated time. In an embodiment, a financial instrument or option is associated with more than one designated time.

All disclosure regarding financial instruments must be read, not only associated with financial quotes, but also associated with actual outcomes of events in general, and games in particular. Namely, financial instruments or options can be build based on forecasts received from buyers on one, or on a plurality of outcomes of events.

In one embodiment, for example, a buyer can send forecasts associated to one or several outcomes associated with games for designated times, and the financial operator builds a financial contract based on the information received from the buyer. In one embodiment, for example, a buyer can send forecasts associated to one or several outcomes associated with sports (or one sport) for designated times (or one designated time), and the financial operator builds a financial contract based on the information received from the buyer. In one embodiment, for example, a buyer can send forecasts associated to one or several outcomes associated with video games (or one video game) for designated times (or one designated time), and the financial operator builds a financial contract based on the information received from the buyer. In one embodiment, for example, a buyer can send forecasts associated to one or several outcomes associated with casino games (or one casino game) for designated times (or one designated time), and the financial operator builds a financial contract based on the information received from the buyer. In one embodiment, for example, a buyer can send forecasts associated to one or several outcomes associated with lottery games (or one lottery) for designated times (or one designated time), and the financial operator builds a financial contract based on the information received from the buyer. In one embodiment, for example, a buyer can send forecasts associated to one or several outcomes associated with poker for designated times (or one designated time), and the financial operator builds a financial contract based on the information received from the buyer.

All financial instruments, or options described in this application or described in U.S. Ser. No. 12/003,394 can be tradable, or not tradable.

The method described in U.S. Ser. No. 12/003,394 for pricing multi asset options may be used to price a basket option or a rainbow option including dot-options. It can be used to price a basket option or a rainbow option including several financial instruments described in this application, wherein each financial instrument or option is associated with one underlying or one quote. It can be used to price a basket option or a rainbow option including several financial instruments described in this application, wherein each financial instrument or option is associated with a plurality underlying or one quote. It can be used to price a basket option or a rainbow option including several financial instruments described in this application, wherein each financial instrument or option is associated with one underlying or quote or with several underlying or quote.

Multiple

The invention comprises a method and associated techniques that can be used by a free gaming operator to generate revenues from its players without charging them for the right to play.

The general method consists in enabling a player to play at once multiple plays. Instead of playing once for one play only, the player will play once, but for several plays. A process consists in enabling the player to ask a processor to generate multiple plays automatically. The generation of plays can be done at complete random. The processor which is asked to generate the multiple plays can also take into account information given by the player for the multiple plays generation. The generation of multiple plays can also be a mix of random and generation based on information given by the player.

Whereas players can not be charge for playing, enabling a player to play multiple plays is a service a player can be charged for. A player can for example be enabled to play either X times by himself, of to play X times by using a multiple plays generation service. In a free game, for example, a player can be enabled to play 5 free individual plays, or can have a single play action triggering off the generation by a processor of 5 free individual plays.

The generation service proposed to the player is valuable, as the player can save time. He can play as many times but without having to spend his own time playing. The processor does this for him. One can easily understand that time savings can be huge. For a multiple plays of 5 plays, times savings are small, even if effective, because 5 is a small number. But the more the number of the plays grows, the more valuable the service is for the player. A player that may be hesitating between playing five free plays by himself and pay for an automatic generation of 5 free plays will be far less hesitating if he expects to play, for example, 20 free plays.

This behavioral understanding can clearly lead a free game operator to a strategy of extending significantly and deliberately the number of free plays that a player is enabled to play.

A common strategy for a game operator can traditionally consist in limiting the number of times a player can play, as revenue models of free games are not based on charging players for playing. Once for a competition, or once a day, or twice for a gaming session, are examples. As winners represent a cost for the game organiser, and revenues may be based on displays or database selling, a good management of the game leads to contingent the number of free plays a player can play.

But the possibility to get revenues which are correlated with the numbers of plays changes this traditional logic and can lead a good management to a new logic which is closer to a paid-for game. In this new logic, the objective is not only to maximise the number of players, but also to maximize the sale of services of generation requests of multiple plays. This will lead a good management to increase very substantially the number of free plays a player can individually play and propose at the same time a multiple plays generation service.

An embodiment of the invention is, for example, a free game with 100 free plays per session along with a generation service simultaneously proposed. Theoretically, any player can choose to play 100 individual plays, one by one. But in practise, the time spending will be so huge that anyone would choose either to play a very limited number of individual free plays, or to pay effectively for the generation of 100 multiple free plays.

The method can be applicable to games of chance. The generation process of free plays may be totally at random. It can also be based on information associated with the player. It can be based on information given by the player, requests expressed by the player, and any type of data that can be associated with the player and be used by the processor as basis or criteria to generate the free plays.

The method can be applicable to games of skill, and to games of mixed skill and chance. Here too, generation process of free plays may be totally at random. It may for example help those who want to play to a game of skill without having the necessary skill to do so. It can also be based on information associated with the player. It can be based on information given by the player, requests expressed by the player, and any type of data that can be associated with the player and be used by the processor as basis or criteria to generate the free plays. For example, it can be the case in a game of skill or mixed chance and skill wherein information given by the player reflects the strategy of the player.

Financial Forecasting Game

Certain embodiments of the invention hereafter are associated with a financial forecasting game. Namely, they can be associated with the financial forecasting game disclosed in of U.S. Ser. No. 12/003,394, filed on Dec. 26, 2007.

Autopick

An autopick service can be proposed to players. This can namely be interesting to those who want to be able to play without feeling skilled enough. It can also be interesting for players who want to be guided in their choice, for any reason. By pressing a button or clicking on a display device or any other way of requesting, a player can ask the processor to automatically generate a set of financial forecasts. In an embodiment, the request will generate a forecast for the Dow Jones, for the Nasdaq, and for the Paris CAC for the next closing date corresponding to the game session. In an embodiment, the request will generate financial forecasts relative to the game and validate them at once. In an embodiment, the request will generate financial forecasts and propose them to the player which can validate them as such or not. In an embodiment, the player can be proposed forecasts and be enabled to amend them.

In order to do so, the processor may generate numbers at total random. The processor can also use forecasts from other players to generate forecasts. The processor can also use quote series or probabilistic methods to generate forecasts. The processor can also use advisor or advice-based forecast generation. The processor can use calculation or programmation techniques to generate a set of forecasts which is more or less likely.

Options of generation can be proposed to the player to reflect different playing strategies. An embodiment is a set of forecasts generated with high risk-high return, medium risk-medium return, or low risk-low return profiles. Predefined profiles can be proposed for the players to position themselves. An indication of strategy can also be given by the player and be taken into account for the forecasts generation. A level of risk can be given by the player. The generation can be based on information that can be directly or indirectly interpreted as the strategy of the player.

Embodiment options can also let players choose to include certain quotes and not others. Options can include let the processor select which quotes to include. In this case, the selection can be done at random, or based on information given by the player, or based on historical data, or on a combination thereof. Options can include letting players play totally at random. Options can include letting players play at random between realistic ranges of numbers. Probabilistic techniques can be used to determine the realistic ranges of numbers.

In an embodiment, a player can be proposed an average of forecasts already expressed by other players. A player can also be proposed averages of forecasts, but expressed by one or several categories of players. For example, the game operator may assess players according to their past performances and create categories according to such past performance criteria.

Autopick service can be proposed for free. It can also be proposed with a charge of service for the player. In one embodiment, autopick service can be proposed for a forecasting game. This forecasting game does not have to be financial. In one embodiment, autopick service can be proposed for a game. This game does not have to be a forecasting game. In one embodiment, autopick service can be proposed for a game. This game does not have to be a financial game.

In an embodiment, a player is proposed to play. This can be done by pressing a button, clicking, touching a screen, or speaking, like for example speaking to a voice recognition system. A set of forecasts is automatically generated, associated with the player, and validated.

Multiplay

A method for the financial forecasting game can consist in proposing a service for generating multiple plays. Namely, when free sets of forecasts are received from a player, the method consists in enabling a player to generate multiple plays. Namely, the service can be charged to the player. Namely, the multiple plays generated can be free plays. When the plays are free plays whereas the multiple plays service is charged to the player, the financial forecasting game is free but his business model becomes closer or similar to a paid-for model.

This service of multiple plays is similar to the hereabove service of autopick, but instead of generating one set of forecasts, the service generates a plurality of sets of forecasts. In an embodiment, the player expresses his forecasts in a similar way he does it when playing a simple play. But he requests the processor to generate multiple plays. This can be done by pressing a button or clicking on a display device or any other way of requesting. The player makes a request and the processor generates multiple sets of forecasts corresponding to the request or the player.

The multiple play—hereafter multiplay—service can be proposed to players who want to generate a plurality of sets of forecasts at once.

The multiplay can enable a player to make a plurality of sets of forecasts, the generation of sets or the generation of forecasts being based on the request of the player. In one embodiment, a player can choose how many sets they want to generate. In one embodiment, a player can generate a plurality of hereabove described autopicks. In one embodiment, a player can choose between different strategies of forecasts generation. For example, the processor can generate forecasts based on high risk-high return, medium risk-medium return, or low risk low return profiles. Predefined profiles can be proposed for the players to position themselves. An indication of strategy can also be given by the player and be taken into account for the forecasts generation. A level of risk can be given by the player as an input for example.

In an embodiment, a player can express his basic forecasts, and choose or express a tolerance margin. The processor will then generate series of forecasts which will fall in ranges of numbers calculated from each expressed basic forecast and tolerances.

In an embodiment, a player expresses three financial forecasts by inputting the forecasted values of the quotes like he does it for a simple bet. The validation of his bet will then trigger off the validation of a predefined number of plays. In other embodiments, the player will be asked, after inputting his forecasts, to specify additional information on which the generation of multiple plays will be based. This information may include the number of desired plays included in the multiple plays. It may include a tolerance or tolerances to calculate the ranges between which the generated plays will fall. It may include specifying a particular type of generation.

In an embodiment, the multiplay proposes in one click a multiple plays, each of which being an autopick as described hereabove. Autopicks may be then generated totally at random, each individually. In an embodiment, one autopick is generated first, an multiple plays are generated based on the first autopick.

Options of generation can be proposed to the player to reflect different playing strategies. An embodiment includes sets of forecasts generated with high risk-high return, medium risk-medium return, or low risk low return profiles. Predefined profiles can be proposed for the players to position themselves. An indication of strategy can also be given by the player and be taken into account for the forecasts generation. A level of risk can be given by the player as an input for example.

Embodiment options can also let players choose to include certain quotes and not others. Options can include let the processor select which quotes to include. In this case, the selection can be done at random, or based on information given by the player, or based on historical data, or on a combination thereof. Options can include letting players play totally at random. Options can include letting players at random between realistic ranges of numbers. Probabilistic techniques can be used to determine the realistic ranges of numbers.

In an embodiment, a player can be proposed an average of forecasts already expressed by other players. A player can also be proposed averages of forecasts, but expressed by one or several categories of players. For example, the game operator may assess players according to their past performances and create categories according to such past performance criteria.

All descriptions hereabove used for the autopick service, can be used for the multiplay service.

Multiplay service can be proposed with a charge of service for the player.

Lottery

One embodiment of the invention is associated with a free lottery. In this embodiment, players are enabled to play for free, i.e. without to be charged to have the right to play. The can fill in grids for example, or any type of input specified in the lottery game rules.

In an embodiment, for example, free plays can be generated totally at random. This may seem suitable for some players who prefer to play at random. In an embodiment, free plays can be generated based on one or several numbers expressed by the player, for the processor to generate free plays based on these numbers. This can be suitable, for example, for players who have preferred numbers, and want to play free games including these. This is the case, for example, of players with what they believe are their own lucky numbers, players who want to play numbers associated with birth dates, players who study series of past lottery numbers to make their projections, players who believe in non conventional methods to predict like medium based predictions, and more generally any player who want to choose in part the content of lottery grids.

In an embodiment, the player can ask the processor to generate multiple lottery grids, the processor generating all at random. In an embodiment, the player can specify one or several numbers and ask the processor to generate grids with the specified numbers and additional numbers to complete the grids. The additional numbers can be generated by the processor at random, or based on the numbers specified by the player. They can be generated based on information included in the registration form of the player, or taken by the processor as basis, like date or time of the request, or any other information that can be used for such a generation.

The player can also specify the number of free plays he wants the processor to generate. The player can then have a preferred strategy, even for games of chance. A player can ask the processor to generate a first part of the multiple plays with given numbers included, and a second part of the multiple plays with other given numbers included.

All hereabove descriptions can apply to any free game. Namely, the method can be applied to games of chance, of skill, or of mixed chance and skill. It can be applied to betting games and forecasting games. It can be applied to sports games.

Complements

In an embodiment, players can use a system based on grouped forecasts. Players are enabled to play several times. They can express their bets one by one. But they also can use a system, where the system provide them with several bets. For instance, in an embodiment asking a forecast of three market indexes, such as the DEA, the Nasdaq, and the Paris CAC, and enabling players to play ten times, players could make ten bets composed of their expressed forecasts, validated one by one. They could also make one bet, and the system will determine nine other bets according to particular specifications. For example, a player can express three values of quotes and validate a single bet. He also can express three values of quotes and ask for a grouped bet: the system determines nine other bets in a range of values that can be more or less near the values of the values he has expressed, according to propositions of the system or the player. In an embodiment, the player can determine the range of values that the system can include in one bet, or specify if the range has to be broad or narrow, or random, or any particular specification of values, or any combination thereof. In an embodiment, the player can determine the number of bets to be attached to a bet he has made: he can make one bet and determine the number of bets he wants, for instance four, to be determined by the system in addition to the bet he has made. In our example, he would get five bets, one being made of his values, and four being automatically generated by the system according to his specifications: narrow, broad, random, or any other specification.

In an embodiment, the player can ask the system directly for a number of bets without proposing a value, and get several bets with values determined by the system. For instance, a player could let the system determine values on a random basis. In another embodiment, the player can choose a group of bets centered on specific values, such as likely values proposed by the system, forecasts of experts, forecasts of other players, averages of forecasts expressed by players or categories of players. Players can be thus enabled to play a bunch of bets based on likely values without having to be expert themselves.

A particular interest of grouped bets is the possibility to sell this service to players. In an embodiment, the game is offered for free to the players and players can play 100 times a day. They can either make 100 free bets, one by one, which takes time, or save time and energy by buying the possibility to make their 100 free bets very quickly. One must understand that 100 bets in an example and that it could be any number of bets taken as a maximum bets for a determined period of time, that grouping of bets could be bought by 100 or 10 or 3 or any number, and that possibility can be offered in a free game as well as in a paid for game or a game with any other business model.

To make the grouping service even more attractive for the player, game rules can be established or changed in order to have limited probabilities to be a winner with a bet only while possibilities to win are extended in proposing grouped bets. For example, in an embodiment A, a player can play once a day with a p probability to win for one play, whereas in an embodiment B, a player can play 100 times a day with a p/100 probability to win for one play but the opportunity to buy a grouping of 100 plays. If one compare embodiments A and B, one can see that B has many advantages and namely, for a same cost for the game organiser, he enables the players who want to play for free to play many more games whereas the game can make money with a grouping service dedicated to those who want to play quick with the best chances.

Namely, this service may be specifically interesting in countries where the legislation is currently restrictive for paid-for games. In such countries, a game of chance can't be sold to players. But a game can sell service to players, and grouping is a service. This offers the possibility for many games to abide the law and to make players contribute.

Explicitly, all embodiments described in this application include, or can include, the use of a screen touch. Explicitly, all embodiments described in this application include, or can include, the use of a touchscreen. They explicitly include embodiments associated with games, associated with gaming, associated with finance, and associated with financial instruments. Namely, they can include the use of a display device having a touchscreen, or associated with a touchscreen.

Remark, applicable to all types of games. Another way of obtaining a model which is closer to a paid-for model can be to have a player pay to play, but to propose at the same time to reimburse him. Theoretically, the game is free. But, as it is expected that not all players will ask for reimbursing, the model is closer to a paid-for model. For example, in one embodiment, the player is asked to pay for playing a game, but can be refunded if he asks it under certain conditions. He may be asked to give specific information to support his request. For example, in one embodiment, the player can be asked to pay to play to a financial forecasting game whose embodiments is described in this application. He can be reimbursed after asking the gaming operator to do so. In some legislations, one access to the game has to be free for the game being considered to be free. A way of obtaining a model which is closer to a paid-for model can consist in offering a free access to the game via one technology and having players pay for any alternative access if they wish to use it. For example, in one embodiment, the player can play for free through a standard screen access through the internet, but he will be asked to pay for an alternative access using another type of display device or another type of data transfer. For example, in an embodiment, the player will be charged for an access through a mobile phone. In an embodiment he will be charged for an access through a tablet. In an embodiment, he will be charged if data transfers use wireless technology. Basically the player can be charged for anything, as far as at least one way of playing is free of charge to him. In an embodiment, the player can play for free from a computer whereas he is charged if he wants to play from a mobile phone. All described techniques can be used in combination. For example, an embodiment can be a game with a free access having a paid-for access with refunds, completed or combined with one or several alternative paid-for accesses to the game. An embodiment can be the previous one, completed or combined with a paid-for multiplay service. These techniques can be used for embodiments associated with one or several financial forecasting games. These techniques can be used for embodiments associated with one or several forecasting games. They can be used for embodiments associated with one or several free games. They can namely be used for lottery embodiments.

We claim:

1. A method for a financial forecasting game, said method comprising:
    causing a processor to execute a plurality of instructions stored on at least one memory device to:
    (a) receive one or more requests from a player, wherein each request is associated with a payment from the player, and wherein each payment is either: (i) equal to zero, or (ii) greater than zero,
    (b) in response to receiving each request, generate a first set of forecasts associated with the player, the first set having a first forecast and a second forecast, wherein the first forecast is associated with a designated first financial quote at a designated first time, and wherein the second forecast is associated with a designated second financial quote at a designated second time,
    (c) determine a first tolerance associated with the first forecast,
    (d) determine a second tolerance associated with the second forecast,
    (e) determine a first value of the designated first financial quote associated with the first forecast for the designated first time, wherein the determined first value of the designated first financial quote is equal to an actual value of the designated first financial quote at the designated first time, (f) determine a first value of the designated second financial quote associated with the second forecast for the designated second time, wherein the determined first value of the designated second financial quote is equal to an actual value of the designated second financial quote at the designated second time, (g) determine a second value of the designated first financial quote associated with the first forecast for a designated first previous time, wherein the determined second value of the designated first financial quote is equal to an actual value of the designated first financial quote at the designated first previous time, (h) determine a second value of the designated second financial quote associated with the second forecast for a designated second previous time, wherein the determined second value of the designated second financial quote is equal to an actual value of the designated second financial quote at the designated second previous time, (i) determine if the first forecast is acceptable based on: (i) the determined first value of the designated first financial quote associated with the first forecast for the designated first time, and (ii) the first tolerance associated with the first forecast, (j) determine if the second forecast is acceptable based on: (i) the determined first value of the designated second financial quote associated with the second forecast for the designated second time, and (ii) the second tolerance associated with the second forecast, (k) determine if the first set is associated with a first prize having a first prize value, wherein the first set is associated with the first prize when: (i) the first forecast is acceptable and (ii) the second forecast is acceptable, and (l) if the determination is that the first set is associated with the first prize:
  (i) determine the prize value of the first prize based on: (A) the determined first value of the designated first financial quote associated with the first forecast for the designated first time, (B) the determined second value of the designated first financial quote associated with the first forecast for the designated first previous time, (C) the determined first value of the designated second financial quote associated with the second forecast for the designated second time, and (D) the determined second value of the designated second financial quote associated with the second forecast for the designated second previous time, and
  (ii) provide the first prize having the determined prize value to the player.

2. The method of claim 1, which includes: causing the processor to execute a plurality of instructions stored on the at least one memory device to change at least one of:
(a) the determined first value of the designated first financial quote associated with the first forecast for the designated first time to be equal to at least one of (i) an exact value of the designated first financial quote associated with the first forecast for the designated first time, (ii) an integer part of the actual value of the designated first financial quote associated with the first forecast at the designated first time, and (iii) a rounded value of the actual value of the designated first financial quote associated with the first forecast at the designated first time, and (b) the determined first value of the designated second financial quote associated with the second forecast for the designated second time to be equal to at least one of (i) an exact value of the designated second financial quote associated with the second forecast for the designated second time, (ii) an integer part of the actual value of the designated second financial quote associated with the second forecast at the designated second time, and (iii) a rounded value of the actual value of the designated second financial quote associated with the second forecast at the designated second time.

3. The method of claim 1, which includes: causing the processor to execute a plurality of instructions stored on the at least one memory device to:
(a) determine a first ranking of the first set, and
(b) determine if the first set is associated with a third prize based on the first ranking of the first set.

4. The method of claim 1, which includes: causing the processor to execute a plurality of instructions stored on the at least one memory device to generate the first forecast: (i) randomly, (ii) based on at least one input received from the player, (iii) based on at least a probability calculation, (iv) based on an average, (v) based on an advisor, (vi) based on an expert, or (vii) automatically.

5. The method of claim 1, which includes: causing the processor to execute a plurality of instructions stored on the at least one memory device to:
(a) receive one or more second requests from a second player, each second request being associated with a second payment from the second player, wherein each second payment is either: (i) equal to zero, or (ii) greater than zero,
(b) in response to receiving each second request, generate a second set of forecasts associated with the second player, the second set including a third forecast and a fourth forecast, wherein the third forecast is associated with a designated third financial quote at a designated third time, and wherein the fourth forecast is associated with a designated fourth financial quote at a designated fourth time,
(c) determine a third tolerance associated with the third forecast,
(d) determine a fourth tolerance associated with the fourth forecast,
(e) determine a first value of the designated third financial quote associated with the third forecast for the designated third time, wherein the determined first value of the designated third financial quote is equal to an actual value of the designated third financial quote at the designated first time,
(f) determine a first value of the designated fourth financial quote associated with the fourth forecast for the designated fourth time, wherein the determined first value of the designated fourth financial quote is equal to an actual value of the designated fourth financial quote at the designated fourth time,
(g) determine a second value of the designated third financial quote associated with the third forecast for a designated third previous time, wherein the determined second value of the designated third financial quote is equal to an actual value of the designated third financial quote at the designated third previous time,
(h) determine a second value of the designated fourth financial quote associated with the fourth forecast for a designated fourth previous time, wherein the determined second value of the designated fourth financial quote is equal to an actual value of the designated fourth financial quote at the designated fourth previous time, (i) determine if the third forecast is acceptable based on: (i) the determined first value of the designated third financial quote associated with the third forecast for the designated third time, and (ii) the third tolerance associated with the third forecast, (j) determine if the fourth forecast is acceptable based on: (i) the determined first value of the designated fourth financial quote associated with the fourth forecast for the designated fourth time, and (ii) the fourth tolerance associated with the fourth forecast, (k) determine if the second set is associated with a second prize having a second prize value, wherein the second set is associated with the second prize when (i) the third forecast is acceptable and (ii) the fourth forecast is acceptable, and (l) if the determination is that the second set is associated with the second prize:
(i) determine the prize value of the second prize based on: (A) the determined first value of the designated third financial quote associated with the third forecast for the designated third time, (B) the determined second value of the designated third financial quote associated with the third forecast for the designated third previous time, (C) the determined first value of the designated fourth financial quote associated with the fourth forecast for the designated fourth time, and (D) the determined second value of the designated fourth financial quote associated with the fourth forecast for the designated fourth previous time, and
(ii) provide the second prize having the determined prize value to the second player.

6. The method of claim 5, which includes: causing the processor to execute a plurality of instructions stored on the at least one memory device to:
(a) determine a first ranking of the first set associated with the player,
(b) determine a second ranking of the second set associated with the second player,
(c) determine if the first set is associated with a third prize based on the first ranking of the first set, and
(d) determine if the second set is associated with a fourth prize based on the second ranking of the second set.

7. A method of providing a financial forecasting game, said method comprising:
causing a processor to execute a plurality of instructions stored on at least one memory device to:
(a) receive one or more requests from a player, wherein each request is associated with a payment from the player, and wherein each payment is either: (i) equal to zero, or (ii) greater than zero,
(b) for each request received from the player, generate a plurality of sets of forecasts associated with the request received from the player, each of the plurality of sets having a first forecast and a second forecast, wherein the first forecast is associated with a designated first financial quote at a designated first time, and wherein the second forecast is associated with a designated second financial quote at a designated second time, and
(c) for each of the plurality of sets of forecasts generated for the player:
(i) determine a first tolerance associated with the first forecast of the generated set of forecasts,
(ii) determine a second tolerance associated with the second forecast of the generated set of forecasts,
(iii) determine a first value of the designated first financial quote associated with the first forecast for the designated first time, wherein the determined first value of the designated first financial quote is equal to an actual value of the designated first financial quote at the designated first time,
(iv) determine a first value of the designated second financial quote associated with the second forecast for the designated second time, wherein the determined first value of the designated second financial quote is equal to an actual value of the designated second financial quote at the designated second time,
(v) determine a second value of the designated first financial quote associated with the first forecast for a designated first previous time, wherein the determined second value of the designated first financial quote is equal to an actual value of the designated first financial quote at the designated first previous time,
(vi) determine a second value of the designated second financial quote associated with the second forecast for a designated second previous time, wherein the determined second value of the designated second financial quote is equal to an actual value of the designated second financial quote at the designated second previous time,
(vii) determine if the first forecast is acceptable based on: (A) the determined first value of the designated first financial quote associated with the first forecast for the designated first time, and (B) the first tolerance associated with the first forecast,
(viii) determine if the second forecast is acceptable based on: (A) the determined first value of the designated second financial quote associated with the second forecast for the designated second time, and (B) the second tolerance associated with the second forecast,
(ix) determine if the generated set of forecasts is associated with a prize having a prize value, wherein the set is associated with the prize when (A) the first forecast is acceptable and (B) the second forecast is acceptable, and
(x) if the determination is that the generated set of forecasts is associated with the prize:
(A) determine the prize value of the prize based on: (1) the determined first value of the designated first financial quote associated with the first forecast for the designated first time, (2) the determined second value of the designated first financial quote associated with the first forecast for the designated first previous time, (3) the determined first value of the designated second financial quote associated with the second forecast for the designated second time, and (4) the determined second value of the designated second financial quote associated with the second forecast for the designated second previous time, and
(B) provide the prize having the determined prize value to the player.

8. The method of claim 7, wherein one or more of the requests includes an input from the player related to at least one of: (i) the first forecast, (ii) the second forecast, (iii) the first tolerance, (iv) the second tolerance, (v) the designated first financial quote, and (vi) the designated second financial quote.

9. The method of claim 7, which includes causing the processor to execute the plurality of instructions stored on the at least one memory device to:

(a) receive one or more requests from a second player, wherein the second player is different from the player, wherein each request is associated with a payment from the second player, and wherein the payment is either (i) equal to zero, or (ii) greater than zero, (b) for each request received from the second player, generate a set of forecasts associated with that request received from the second player, each set having a first forecast and a second forecast, wherein the first forecast is associated with a designated first financial quote at a designated first time, and wherein the second forecast is associated with a designated second financial quote at a designated second time, and (c) for each generated set of forecasts for the second player:
  (i) determine a first tolerance associated with the first forecast,
  (ii) determine a second tolerance associated with the second forecast,
  (iii) determine a first value of the designated first financial quote associated with the first forecast for the designated first time, wherein the determined first value of the designated first financial quote is equal to an actual value of the designated first financial quote at the designated first time,
  (iv) determine a first value of the designated second financial quote associated with the second forecast for the designated second time, wherein the determined first value of the designated second financial quote is equal to an actual value of the designated second financial quote at the designated second time,
  (v) determine a second value of the designated first financial quote associated with the first forecast for a designated first previous time, wherein the determined second value of the designated first financial quote is equal to an actual value of the designated first financial quote at the designated first previous time,
  (vi) determine a second value of the designated second financial quote associated with the second forecast for a designated second previous time, wherein the determined second value of the designated second financial quote is equal to an actual value of the designated second financial quota at the designated second previous time,
  (vii) determine if the first forecast is acceptable based on; (A) the determined first value of the designated first financial quote associated with the first forecast for the designated first time, and (B) the first tolerance associated with the first forecast,
  (viii) determine if the second forecast is acceptable based on (A) the determined first value of the designated second financial quote associated with the second forecast for the designated second time, and (B) the second tolerance associated with the second forecast,
  (ix) determine if the generated set of forecasts is associated with a prize having a prize value, wherein the set is associated with the prize when: (A) the first forecast is acceptable and (B) the second forecast is acceptable, and
  (x) if the determination is that the generated set of forecasts is associated with the prize:
    (A) determine the prize value of the prize based on:
      (1) the determined first value of the designated first financial quote associated with the first forecast for the designated first time, (2) the determined second value of the designated first financial quote associated with the first forecast for the designated first previous time, (3) the determined first value of the designated second financial quote associated with the second forecast for the designated second time, and (4) the determined second value of the designated second financial quote associated with the second forecast for the designated second previous time, and
    (B) provide the prize having the determined prize value to the second player.

10. The method of claim 9, which includes causing the processor to execute the plurality of instructions stored on the at least one memory device to:
  (a) determine a first ranking of the first set associated with the player,
  (b) determine a second ranking of the second set associated with the second player,
  (c) determine if the first set is associated with a third prize based on the first ranking of the first set, and
  (d) determine if the second set is associated with a fourth prize based on the second ranking of the second set.

11. The method of claim 9, wherein at least one of (i) the first forecasts are the same or different forecasts for the player and the second player, (ii) the second forecasts are the same or different forecasts for the player and the second player, (iii) the first forecast for the player is the same as the third forecast for the player, (iv) the second forecast for the player is the same as the fourth forecast for the player, (v) the designated first financial quote and the designated second financial quote are the same financial quote, (vi) the designated third financial quote and the designated fourth financial quote are the same financial quote, (vii) the designated first financial quote and the designated third financial quote are the same financial quote, (viii) the designated second financial quote and the designated fourth financial quote are the same financial quote, (ix) the designated first time and the designated second time are the same time, (x) the designated third time and the designated fourth time are the same time, (xi) the designated first time and the designated third time are the same time, (xii) the designated second time and the designated fourth time are the same time, (xiii) the determined first tolerance and the determined second tolerance are the same tolerance, (xiv) the determined third tolerance and the determined fourth tolerance are the same tolerance, (xv) the determined first tolerance and the determined third tolerance are the same tolerance, and (xvi) the determined second tolerance and the determined fourth tolerance are the same tolerance.

12. The method of claim 7, wherein at least one of the plurality of sets of forecasts generated for the player is associated with the prize when: (A) the first forecast of a first one of the sets is acceptable and (B) the second forecast of a second, different one of the sets is acceptable.

13. The method of claim 7, which includes, for each generated set of forecasts, causing the processor to execute the plurality of instructions stored on the at least one memory device to change at least one of:
  (a) the determined first value of the designated first financial quote associated with the first forecast for the designated first time to be equal to at least one of (i) an exact value of the designated first financial quote associated with the first forecast for the designated first time, (ii) an integer part of the actual value of the designated first financial quote associated with the first forecast at the designated first time, and (iii) a rounded value of the actual value of the designated first financial quote associated with the first forecast at the designated first time, and (b) the determined first value of the designated second financial quote associated with the second forecast for the designated second time to be equal to at least one of (i) an exact value of the designated second financial quote associated with the second forecast for the designated second time, (ii) an integer part of the actual value of the designated second financial quote associated with the second forecast at the designated second time, and (iii) a rounded value of the actual value of the designated second financial quote associated with the second forecast at the designated second time.

14. The method of claim 7, which includes causing the processor to execute the plurality of instructions stored on the at least one memory device to:
    (a) determine a ranking for at least one of the plurality of sets of forecasts generated for the player,
    (b) determine if the at least one set of forecasts is associated with a third prize based on the determined ranking of that set.

15. The method of claim 7, which includes: causing the processor to execute a plurality of instructions stored on the at least one memory device to generate the first forecast: (i) randomly, (ii) based on at least one input received from the player, (iii) based on at least a probability calculation, (iv) based on an average, (v) based on an advisor, (vi) based on an expert, or (vii) automatically.

16. A method of providing a financial forecasting game, said method comprising:
    causing a processor to execute a plurality of instructions stored on at least one memory device to:
    (a) receive one or more requests from a player, wherein each request is associated with a payment from the player, and wherein each payment is either: (i) equal to zero, or (ii) greater than zero,
    (b) for each request received from the player, generate a plurality of sets of forecasts associated with the request received from the player, each of the plurality of sets having a plurality of first forecasts and a plurality of second forecasts, wherein one of the first forecasts is associated with a designated first financial quote at a designated first time or date and another one of the first forecasts is associated with the designated first financial quote at a designated second time or date, and wherein one of the second forecasts is associated with a designated second financial quote at the designated first time or date and another one of the second forecasts is associated with the designated second financial quote at the designated second time or date, and
    (c) for each of the plurality of sets of forecasts generated for the player:
        (i) determine a first tolerance associated with each of the first forecasts of the generated set of forecasts,
        (ii) determine a second tolerance associated with each of the second forecasts of the generated set of forecasts,
        (iii) determine a first value of the designated first financial quote associated with the one first forecast for the designated first time or date, wherein the determined first value of the designated first financial quote is equal to an actual value of the designated first financial quote at the designated first time or date,
        (iv) determine a second value of the designated first financial quote associated with the other first forecast for the designated second time or date, wherein the determined second value of the designated first financial quote is equal to an actual value of the designated first financial quote at the designated second time or date,
        (v) determine a first value of the designated second financial quote associated with the one second forecast for the designated first time or date, wherein the determined first value of the designated second financial quote is equal to an actual value of the designated second financial quote at the designated first time or date,
        (vi) determine a second value of the designated second financial quote associated with the other second forecast for the designated second time or date, wherein the determined second value of the designated second financial quote is equal to an actual value of the designated second financial quote at the designated second time or date,
        (vii) determine a third value of the designated first financial quote associated with the one first forecast for a designated first previous time or date, wherein the determined third value of the designated first financial quote is equal to an actual value of the designated first financial quote at the designated first previous time or date,
        (viii) determine a fourth value of the designated first financial quote associated with the other first forecast for a designated second previous time or date, wherein the determined fourth value of the designated first financial quote is equal to an actual value of the designated first financial quote at the designated second previous time or date,
        (ix) determine a third value of the designated second financial quote associated with the one second forecast for the designated first previous time or date, wherein the determined third value of the designated second financial quote is equal to an actual value of the designated second financial quote at the designated first previous time or date,
        (x) determine a fourth value of the designated second financial quote associated with the other second forecast for the designated second previous time or date, wherein the determined fourth value of the designated second financial quote is equal to an actual value of the designated second financial quote at the designated second previous time or date,
        (xi) determine if the one first forecast is acceptable based on: (A) the determined first value of the designated first financial quote associated with the one first forecast for the designated first time or date, and (B) the first tolerance associated with the one first forecast,
        (xii) determine if the other first forecast is acceptable based on: (A) the determined second value of the designated first financial quote associated with the other first forecast for the designated second time or date, and (B) the first tolerance associated with the other first forecast,
        (xiii) determine if the one second forecast is acceptable based on: (A) the determined first value of the designated second financial quote associated with the one second forecast for the designated first time or date, and (B) the second tolerance associated with the one second forecast,
        (xiv) determine if the other second forecast is acceptable based on: (A) the determined second value of the designated second financial quote associated with the other second forecast for the designated second time or date, and (B) the second tolerance associated with the other second forecast,
        (xv) determine if the generated set of forecasts is associated with a prize having a prize value, wherein the set is associated with the prize when (A) at least one of: (1) the one first forecast is acceptable, and (2) the other first forecast is acceptable, and (B) at least one of: (1) the one second forecast is acceptable, and (2) the other second forecast is acceptable, (xvi) if the determination is that the generated set of forecasts is associated with the prize:
(A) determine the prize value of the prize based on: (1) the determined first value of the designated first financial quote associated with the one first forecast for the designated first time or date, (2) the determined second value of the designated first financial quote associated with the other first forecast for the designated second time or date, (3) the determined third value of the designated first financial quote associated with the one first forecast for the designated first previous time or date, (4) the determined fourth value of the designated first financial quote associated with the other first forecast for the designated second previous time or date, (5) the determined first value of the designated second financial quote associated with the one second forecast for the designated first time or date, (6) the determined second value of the designated second financial quote associated with the other second forecast for the designated second time or date, (7) the determined third value of the designated second financial quote associated with the one second forecast for the designated first previous time or date, and (8) the determined fourth value of the designated second financial quote associated with the other second forecast for the designated second previous time or date, and
(B) provide the prize having the determined prize value to the player.

17. The method of claim 16, wherein one or more of the requests includes an input from the player related to at least one of: (i) the first forecast, (ii) the second forecast, (iii) the first tolerance, (iv) the second tolerance, (v) the designated first financial quote, and (vi) the designated second financial quote.

18. The method of claim 16, wherein at least one of the plurality of sets of forecasts generated for the player is associated with the prize when: (A) one of the first forecasts of a first one of the sets is acceptable and (B) one of the second forecasts of a second, different one of the sets is acceptable.

19. The method of claim 16, which includes, for each generated set of forecasts, causing the processor to execute the plurality of instructions stored on the at least one memory device to change at least one of:
(a) the determined first value of the designated first financial quote associated with the one first forecast for the designated first time or date to be equal to at least one of:
(i) an exact value of the designated first financial quote associated with the one first forecast for the designated first time or date, (ii) an integer part of the actual value of the designated first financial quote associated with the one first forecast at the designated first time or date, and (iii) a rounded value of the actual value of the designated first financial quote associated with the one first forecast at the designated first time or date,
(b) the determined second value of the designated first financial quote associated with the other first forecast for the designated second time or date to be equal to at least one of: (i) an exact value of the designated first financial quote associated with the other first forecast for the designated second time or date, (ii) an integer part of the actual value of the designated first financial quote associated with the other first forecast at the designated second time or date, and (iii) a rounded value of the actual value of the designated first financial quote associated with the other first forecast at the designated second time or date,
(c) the determined first value of the designated second financial quote associated with the one second forecast for the designated first time or date to be equal to at least one of: (i) an exact value of the designated second financial quote associated with the one second forecast for the designated first time or date, (ii) an integer part of the actual value of the designated second financial quote associated with the one second forecast at the designated first time or date, and (iii) a rounded value of the actual value of the designated second financial quote associated with the one second forecast at the designated first time or date, and
(d) the determined second value of the designated second financial quote associated with the other second forecast for the designated second time or date to be equal to at least one of: (i) an exact value of the designated second financial quote associated with the other second forecast for the designated second time or date, (ii) an integer part of the actual value of the designated second financial quote associated with the other second forecast at the designated second time or date, and (iii) a rounded value of the actual value of the designated second financial quote associated with the other second forecast at the designated second time or date.

20. The method of claim 16, which includes causing the processor to execute the plurality of instructions stored on the at least one memory device to:
(a) determine a ranking for at least one of the plurality of sets of forecasts generated for the player,
(b) determine if the at least one set of forecasts is associated with a third prize based on the determined ranking of that set.

* * * * *